United States Patent
Akhavain Mohammadi et al.

(10) Patent No.: US 10,630,552 B2
(45) Date of Patent: Apr. 21, 2020

(54) WIRELESS COMMUNICATION ACCESS NODE (WCAN) DEVICE BASED POLICY ENFORCEMENT AND STATISTICS COLLECTION IN ANCHORLESS COMMUNICATION SYSTEMS

(71) Applicant: Huawei Technologies Co., Ltd., Shenzhen (CN)

(72) Inventors: Mehdi Arashmid Akhavain Mohammadi, Ottawa (CA); William Carson McCormick, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 15/617,772

(22) Filed: Jun. 8, 2017

(65) Prior Publication Data
US 2018/0359151 A1    Dec. 13, 2018

(51) Int. Cl.
*H04L 12/24*    (2006.01)
*H04W 24/10*    (2009.01)
(Continued)

(52) U.S. Cl.
CPC ...... *H04L 41/0893* (2013.01); *H04L 67/1097* (2013.01); *H04L 67/303* (2013.01);
(Continued)

(58) Field of Classification Search
CPC ..... H04L 41/0893; H04L 41/08; H04L 67/32; H04L 67/34; H04L 67/1097;
(Continued)

(56) References Cited

U.S. PATENT DOCUMENTS 9,125,106 B1    9/2015 Velusamy et al.
2008/0225780 A1    9/2008 McCormick et al.
(Continued)

FOREIGN PATENT DOCUMENTS

CN    105052191 A    11/2015
CN    106063298 A    10/2016
(Continued)

OTHER PUBLICATIONS

International Search Report of corresponding application No. PCT/CN2018/073845; Yu, Xiaoxi, dated Apr. 18, 2018.
(Continued)

*Primary Examiner* — Rownak Islam
(74) *Attorney, Agent, or Firm* — BCF LLP

(57) ABSTRACT

A wireless communication access node (WCAN) device includes radio frequency (RF) circuitry, RF interface (I/F) circuitry, network communication circuitry, memory, and/or processing circuitry. The WCAN device facilitates communications of a wireless communication device (e.g., User Equipment (UE)) in accordance with a policy profile record associated with the wireless communication device (e.g., policy profile record may be retrieved from a distributed cloud database that is distributedly implemented within the mobile backhaul communication system). The WCAN device collects communications statistics based on the communications of the wireless communication device and updates a communications statistics record associated with the wireless communication device within the distributed cloud database to include the communications statistics that are collected based on the communications of the wireless communication device. The distributed cloud database stores policy profile records and communications statistics records for various wireless communication devices including the wireless communication device.

20 Claims, 10 Drawing Sheets

(51) Int. Cl.
*H04L 29/08* (2006.01)
*H04W 12/00* (2009.01)
*H04W 88/08* (2009.01)

(52) U.S. Cl.
CPC ....... *H04W 12/0027* (2019.01); *H04W 24/10* (2013.01); *H04W 88/08* (2013.01)

(58) Field of Classification Search
CPC .... H04L 67/303; H04W 12/04; H04W 24/00; H04W 24/10; H04W 88/08; H04W 12/0027
USPC .......................................................... 370/328
See application file for complete search history.

(56) References Cited

U.S. PATENT DOCUMENTS

| | | | |
|---|---|---|---|
| 2010/0167694 A1 | 7/2010 | Chiussi et al. | |
| 2010/0268820 A1* | 10/2010 | Shi | H04L 67/104 709/224 |
| 2013/0054761 A1 | 2/2013 | Kempf et al. | |
| 2014/0092772 A1* | 4/2014 | Bitar | H04W 8/26 370/254 |
| 2014/0269364 A1 | 9/2014 | Knapp et al. | |
| 2014/0364131 A1 | 12/2014 | Luna et al. | |
| 2015/0256993 A1* | 9/2015 | Bellamkonda | H04W 8/12 455/433 |
| 2016/0065531 A1* | 3/2016 | Xiaopu | H04L 61/103 709/238 |
| 2017/0272433 A1* | 9/2017 | Jaggi | H04W 48/14 |
| 2017/0303169 A1* | 10/2017 | Hampel | H04W 76/12 |
| 2018/0014204 A1 | 1/2018 | Zhang | |

FOREIGN PATENT DOCUMENTS

| | | |
|---|---|---|
| CN | 106464583 A | 2/2017 |
| EP | 2456130 A1 | 5/2012 |
| EP | 2782395 A1 | 9/2014 |

OTHER PUBLICATIONS

Mathias Fischer et al. A Distributed IP Mobility Approach for 3G SAE, 2008 IEEE, pp. 1-6, XP031371601.
F. Hu et al. ID/Locator Distributed Mapping Server, draft-hu-lisp-dht-00. Oct. 18, 2009. total 11 pages. XP015064678.
Extended European Search Report issued in corresponding European patent application 18812685.8 dated Feb. 24, 2020.

* cited by examiner

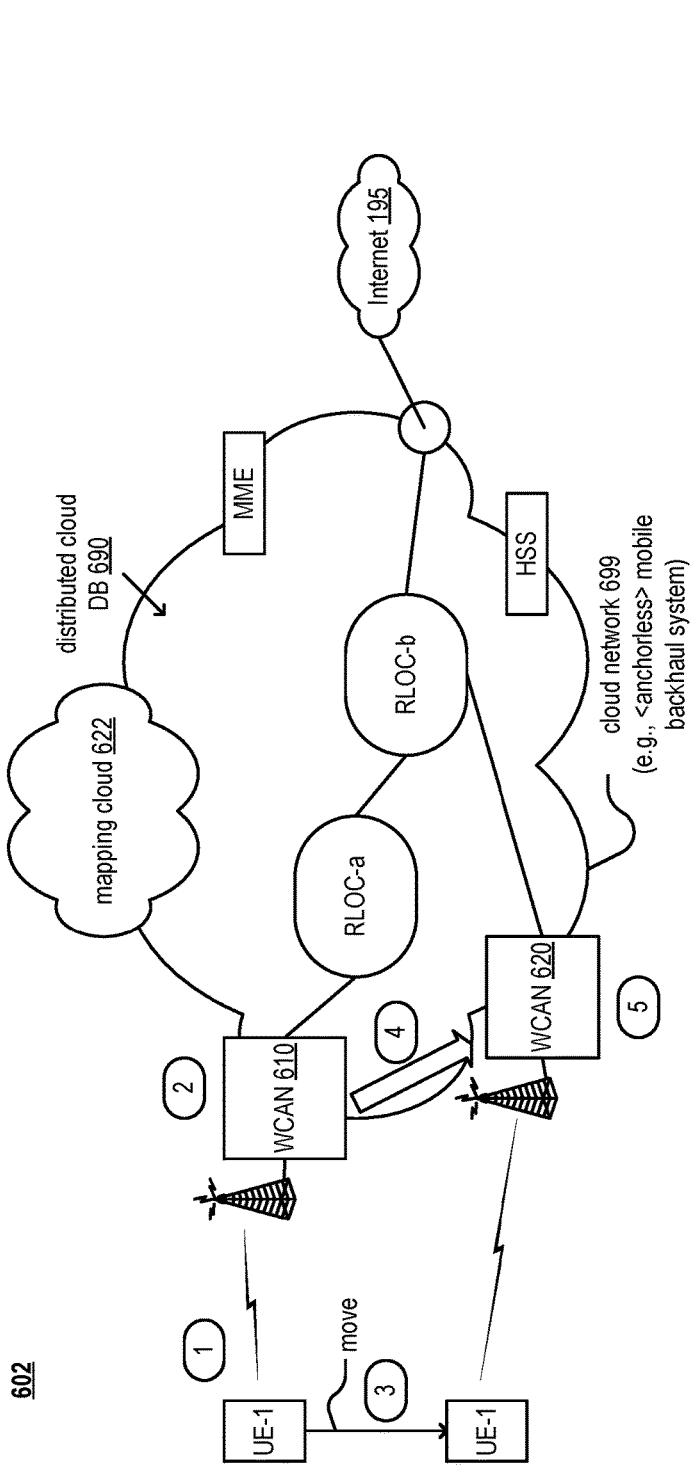

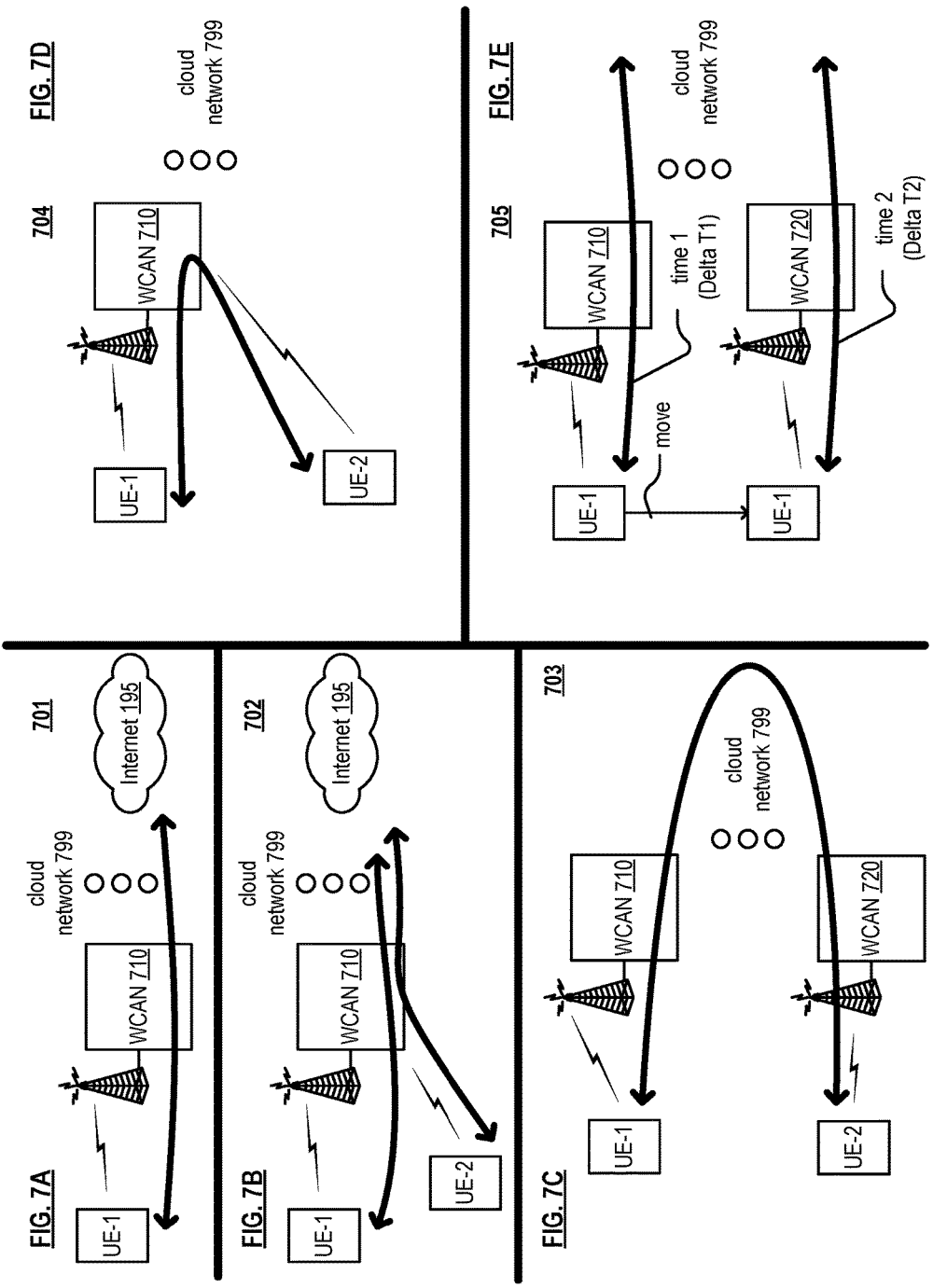

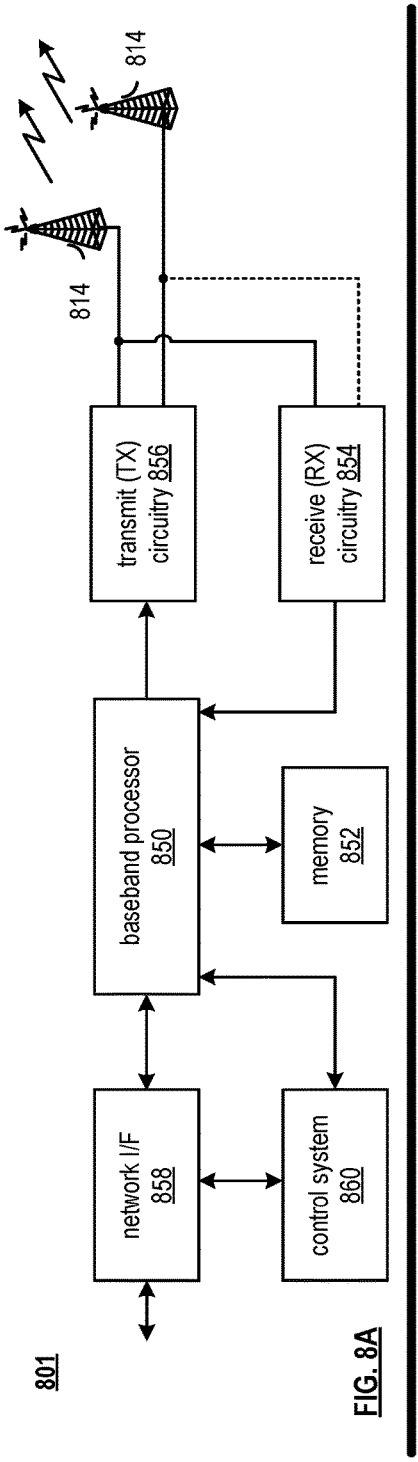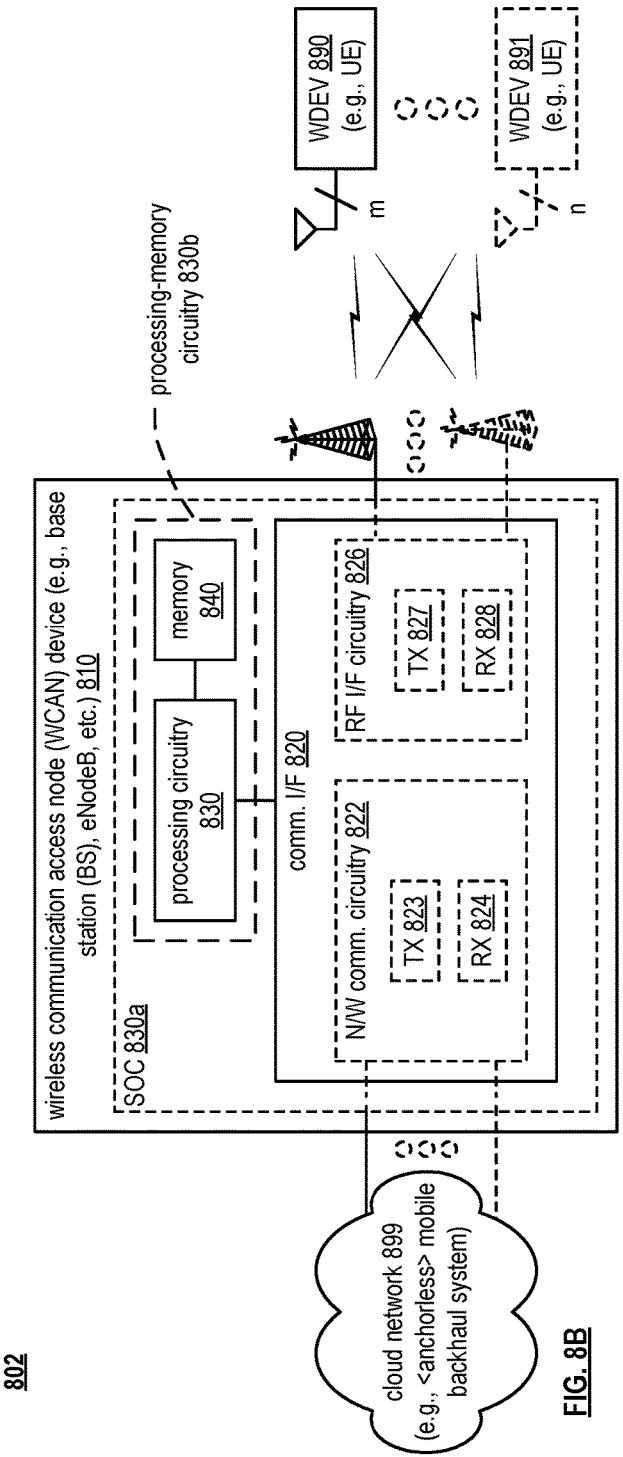
FIG. 8A
FIG. 8B

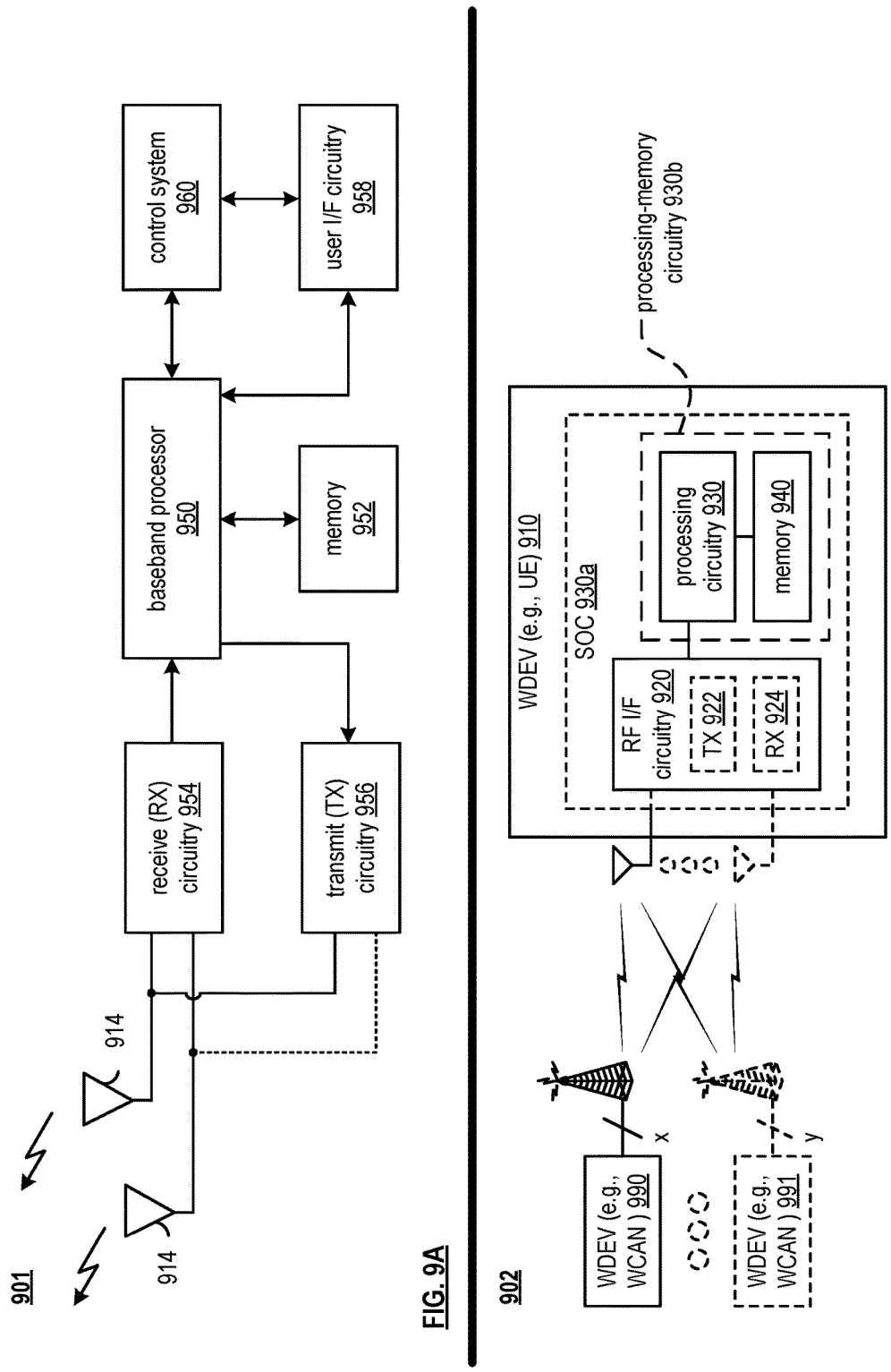

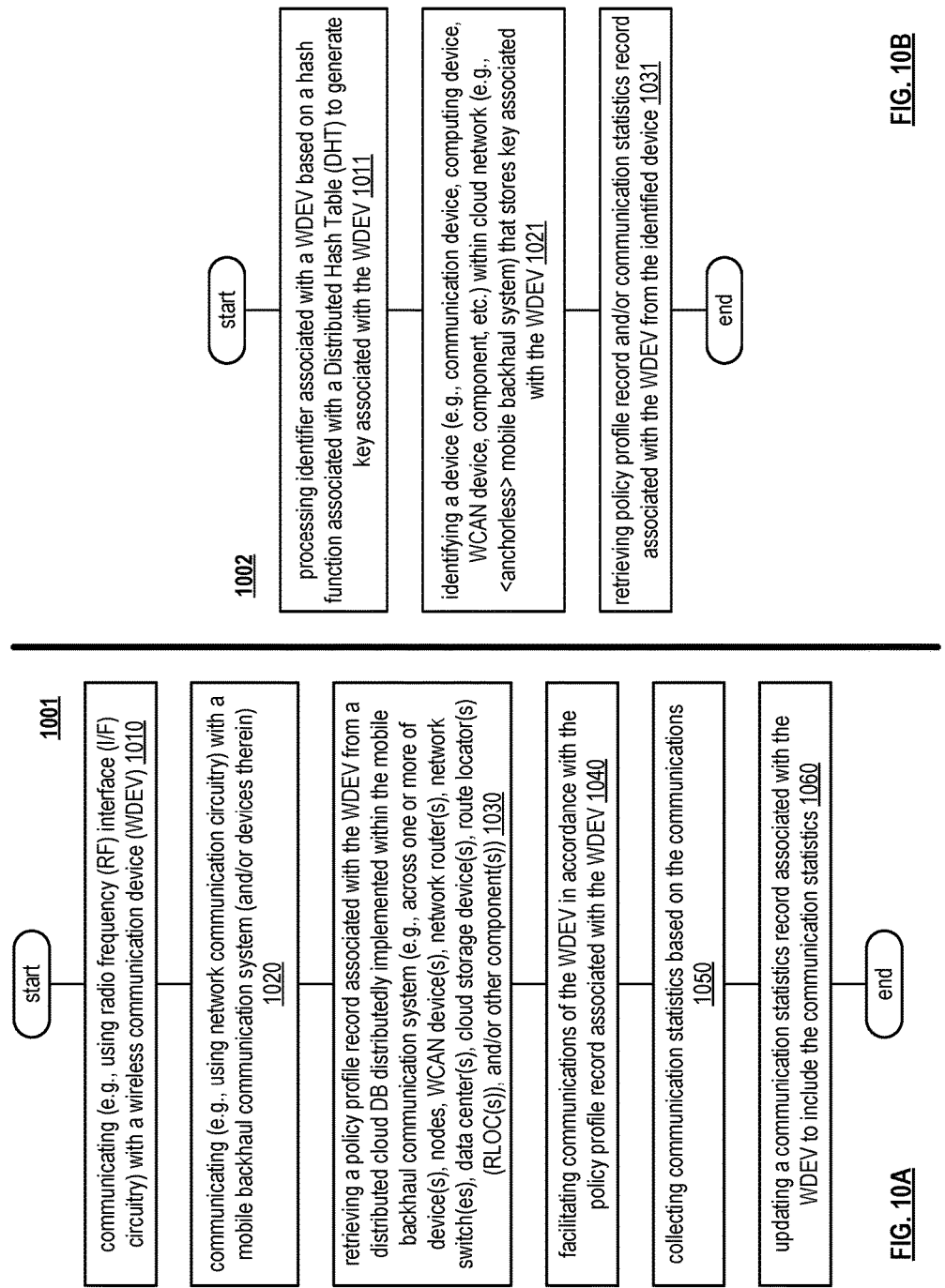

WIRELESS COMMUNICATION ACCESS NODE (WCAN) DEVICE BASED POLICY ENFORCEMENT AND STATISTICS COLLECTION IN ANCHORLESS COMMUNICATION SYSTEMS

CROSS-REFERENCE TO RELATED PATENTS/PATENT APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND

Technical Field

The present disclosure relates generally to communication systems; and, more particularly, to wireless communication access node (WCANs) devices implemented within such communication systems.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In prior art mobile communication systems, dedicated components therein operate to perform certain operations including those associated with billing operations. For example, when a mobile device connects to a prior art mobile communication system, a dedicated component operates to monitor and track communications of the mobile device to effectuate accurate billing such as based on an account associated with a user of the mobile device. Such an implementation of using dedicated components within prior art mobile communication systems to perform certain functions can be very inefficient in terms of the pathways that data must travel therein. For example, such within a prior art mobile communication system communications may suffer from a trombone effect such that the communications need to traverse very indirect pathways and sometimes doubleback over the same or nearby pathways. Such a trombone effect may occur when dedicated components within the prior art mobile communication system are located relatively far from the mobile device and/or other mobile device(s) and/or other networks with which the mobile device communicates and interacts. There continues to be a need in the art for improvement in the implementation and operation of mobile communication systems.

BRIEF SUMMARY

It is an object of the application to provide methods and structures that enable a wireless communication access node (WCAN) devices to perform policy, policing, metering, statistics collection, and all other information gathering based on communications made with one or more wireless communication devices. The WCAN device interacts with a distributed cloud database (DB) that is implemented across a number of devices within a communication system and that stores policy profile records and communications statistics associated with the wireless communication devices.

According to one aspect of the present disclosure, the WCAN device facilitates communications of a wireless communication device (e.g., User Equipment (UE)) in accordance with a policy profile record associated with the wireless communication device. As the WCAN device facilitates the communications of the wireless communication device, the WCAN device collects communications statistics based on those communications of the wireless communication device. The WCAN device then updates a communications statistics record associated with the wireless communication device within the distributed cloud DB based on those collected communications statistics. The distributed cloud DB stores policy profile records and communications statistics records for the wireless communication devices including the wireless communication device with which the WCAN device facilitates communications.

According to certain optional aspects of the present disclosure, the WCAN device and/or another WCAN device is configured to retrieve the policy profile record and the communications statistics record associated with the wireless communication device when subsequently facilitating communications with it. Such information is retrieved from the distributed cloud DB, updated based on the facilitated communications, and then stored back into the distributed cloud DB.

BRIEF DESCRIPTION OF THE SEVERAL VIEWS OF THE DRAWINGS

FIG. 6A is a diagram illustrating an example of a hash function to generate keys based on identifiers in accordance with a Distributed Hash Table (DHT).

FIG. 6B is a diagram illustrating an example of a handover procedure between wireless communication access node (WCAN) devices within a communication system.

FIG. 7A is a diagram illustrating an example of a User Equipment (UE) accessing the Internet via a WCAN device within a communication system.

FIG. 7B is a diagram illustrating an example of a multiple UEs accessing the Internet via a single WCAN device within a communication system.

FIG. 7C is a diagram illustrating an example of a UE-UE connectivity supported via multiple WCAN devices within a communication system.

FIG. 7D is a diagram illustrating an example of a UE-UE connectivity supported via a single WCAN device within a communication system.

FIG. 7E is a diagram illustrating an example of a UE supporting communicating via different WCAN devices based on movement of the UE within a communication system.

FIG. 8A is a diagram illustrating an embodiment of a WCAN device.

FIG. 8B is a diagram illustrating another embodiment of a WCAN device.

FIG. 9A is a diagram illustrating an embodiment of a wireless communication device (e.g., a User Equipment (UE)).

FIG. 9B is a diagram illustrating another embodiment of a wireless communication device (e.g., a UE).

FIG. 10A is a diagram illustrating an embodiment of a method for execution by one or more communication devices.

FIG. 10B is a diagram illustrating another embodiment of a method for execution by one or more communication devices.

DETAILED DESCRIPTION

Figure 1:
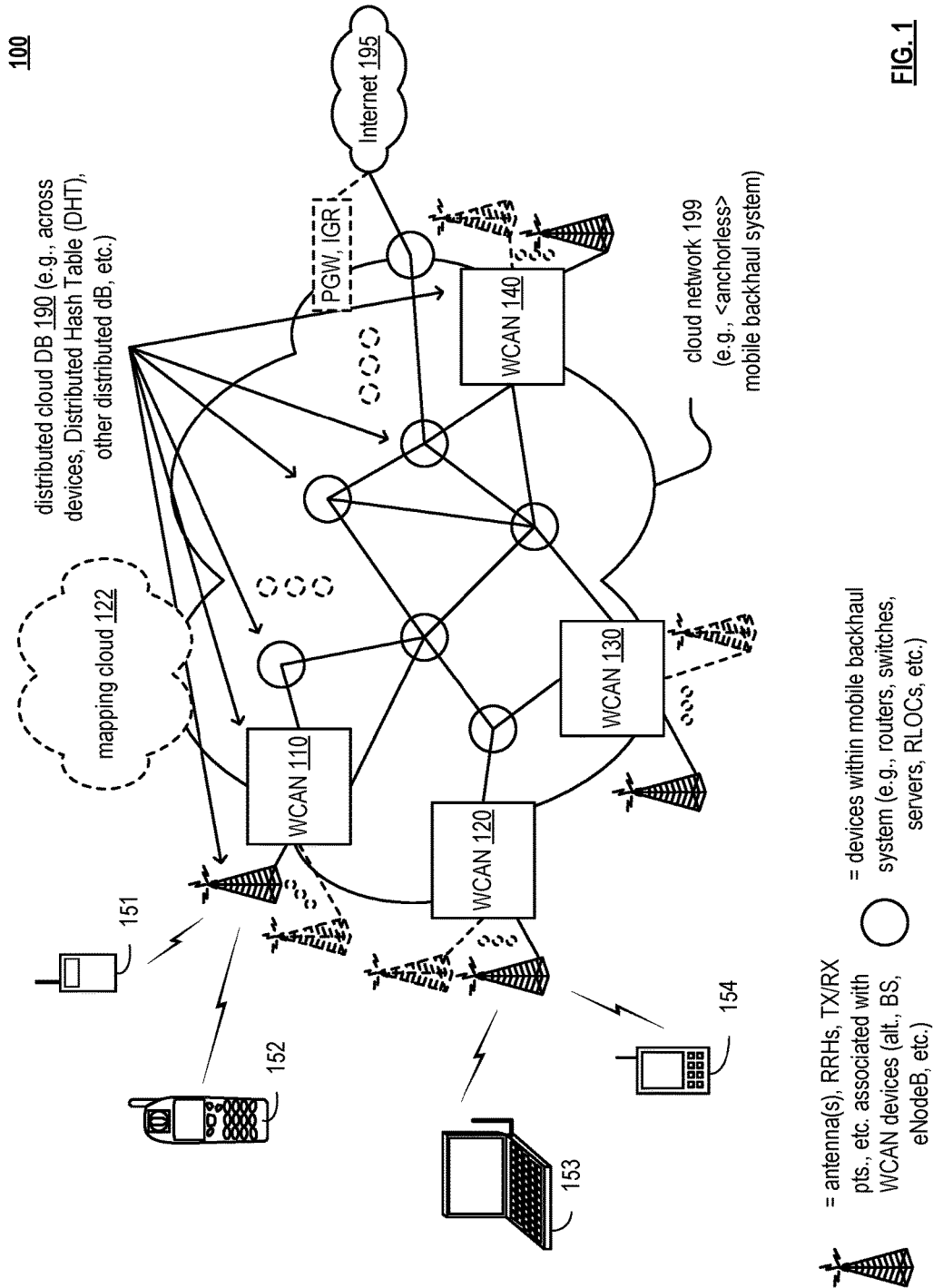
FIG. 1 is a diagram illustrating an embodiment of a communication system that is configured to service wireless communication devices.

FIG. 1 is a diagram illustrating an embodiment 100 of a communication system that is configured to service wireless communication devices. The communication system of this diagram includes wireless communication access node (WCAN) devices 110, 120, 130, and 140, wireless communication devices 151, 152, 153, and 154 (e.g., wireless stations (STAs), User Equipments (UEs), mobile wireless communication devices, stationary/fixed location wireless communication devices, etc.), and a cloud network 199. In some examples, the cloud network is implemented within a mobile backhaul communication system within a communication system that provides mobile communication services to the wireless communication devices 151-154. In other examples, the cloud network is implemented within an anchorless mobile backhaul communication system within a communication system that provides mobile communication services to the wireless communication devices 151-154. Note that an anchorless mobile backhaul communication system does not include dedicated components such as a service gateway (SGW) to effectuate communications for the wireless communication devices 151-154. Instead, in an anchorless mobile backhaul communication system, communications may be effectuated without using the general packet radio service (GPRS) tunneling protocol (GTP) as is used in anchor-based communication systems. An example of a locator/identifier separation protocol (LISP) based anchorless communication system is provided below.

The wireless communication devices 151-154 may be laptop computers, or tablets, personal digital assistants, personal computers, cellular telephones, smart phones, and/or any other wireless communication devices configured to communicate wirelessly with one or more of the WCAN devices 110-140. Other examples of such wireless communication devices 151-154 could also or alternatively include other types of devices that include wireless communication capability. Details of various embodiments of such WCAN devices are described in greater detail with reference to FIG. 8A and FIG. 8B among other diagrams. Details of various embodiments of such wireless communication devices are described in greater detail with reference to FIG. 9A and FIG. 9B among other diagrams.

The WCAN devices 110-140 are operably coupled to various devices (e.g., network hardware) within the cloud network 199. Examples of such devices (e.g., network hardware) include any one or more of WCAN device, router, switch, bridge, modem, system controller, server, data center (e.g., including containers or virtual machines therein such as in a Cloud Radio Access Network (CRAN)), cloud storage device, route locator (RLOC), etc.

In some implementations, a given WCAN device of the WCAN devices 110-140 has associated one or more components (e.g., one or more of antenna(s), antenna array(s), etc.) to communicate wirelessly with the wireless communication devices in its area or proximity. In some examples, such components are co-located with a given WCAN device (e.g., at the same location, or within close proximity to one another such as within a certain distance such as less than or equal to X meters, where X may be 1, 5, 10, 100, or some other positive number used to specify co-location or close proximity). Note than more than one of such components may be employed in various embodiments and for the given WCAN device. Such implementations of a given WCAN device includes the given WCAN device being implemented as a base station, a distributed base station, an Evolved Node B (eNodeB), a Home Evolved Node B (Home eNodeB), or a 5G Evolved Node B (gNodeB), etc.

In other implementations, a given WCAN device of the WCAN devices 110-140 has associated one or more remotely-located components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) to communicate wirelessly with certain of the wireless communication devices. In some examples, such remotely-located components are located remotely with the respective WCAN device (e.g., at a different location, or beyond a close proximity to the respective WCAN device such as at least a certain distance away from the given WCAN device such as more than or equal to Y meters, where Y may be 10, 100, 500, 1 k, or some other positive number used to specify non-co-location or non-close proximity, and where there may be relationship between X above and Y such that within X meters specifies co-location or non-close proximity, and beyond Y meters specifies non-co-location or non-close proximity). The given WCAN device facilitates the communication to/from the certain of the wireless communication devices via its respective one or more remotely-located components. In some examples, the given WCAN device coordinates and manages a set of transmit/receive (TX/RX) points that each respectively support communications for different, respective, and unique cells (e.g., different coverage regions) each having different, respective, and unique cell IDs to support wireless communications in those cells. In addition, in certain implementations, the WCAN device coordinates and manages the set of transmit/receive (TX/RX) points in a manner such that different respective transmit/receive (TX/RX) points use a common cell ID (e.g., in a mobile communication system in which a UE may communicate at the same time or simultaneously with more than one of the transmit/receive (TX/RX) points that share a common cell ID, such may be implemented in accordance with a hypercell configuration in which a UE connects with a logical access node that is composed of multiple eNodeBs, transmit/receive (TX/RX) points, etc.).

Regardless of the specific implementation of the given WCAN device, the given WCAN device is operative to provide communications wirelessly with one or more of the wireless communication devices 151-154 as well as with the cloud network 199. Typically, the wireless communication devices 151-154 registers with a particular one of the WCAN devices 110-140 to receive services from the communication system (e.g., Internet access via the Internet 195, voice calling communications, media such as audio and/or video communications, data communications, etc.). In addition, when the cloud network 199 is implemented as part an anchorless implementation, a mapping cloud 122 includes the current topology and mapping of the respective adaptive and configurable devices within the cloud network 199. Other examples of mapping clouds are described further with respect to other examples and embodiments herein.

Any of the various wireless communication devices (WDEVs) 151-154 and WCAN devices 110-140 may include a processing circuitry, a communication interface, and/or memory to support communications with any other of the WDEVs 151-154 and WCAN devices 110-140. In an example of operation, a processing circuitry and/or a communication interface implemented within one of the devices (e.g., any one of the WDEVs 151-154 and WCAN devices 110-140) is/are configured to process at least one signal received from and/or to generate at least one signal to be transmitted to another one of the devices (e.g., any other one of the WDEVs 151-154 and WCAN devices 110-140).

A distributed cloud database (DB) 190 is implemented across a number of devices within the cloud network 199. For example, a dispersed storage mechanism may be used to store various information in a distributed manner across a number of devices within the distributed cloud DB 190. For example, the distributed cloud DB 190 stores policy profile records associated with the wireless communication devices 151-154 (and optionally other wireless communication devices not shown) and communications statistics associated with the wireless communication devices 151-154 (and optionally other wireless communication devices not shown). In an example, the distributed cloud DB 190 stores a policy profile record and a communications statistics record for wireless communication device 151. The policy profile record includes information related to an account associated with the wireless communication device 151 such as may be with respect to a user or owner of the wireless communication device 151. Examples of such information included in the policy profile record may include any one or more of subscription information, data plan information, services available, capacity, trend analysis, cost allocations, auditing, connection, start-stop information related to such communications, metering, accounting, etc. and/or any other information that may be used to enforce policies associated with the policy profile record when supporting communications and/or collect statistics associated with those communications made in accordance with the policy profile record. In general, such information included in the policy profile record associated with a wireless communication device correspond to all policy, policing, metering, statistics collection, and all other information gathering based on communications made by a given wireless communication device.

In some examples, any information that may be used in accordance with any embodiment of an Authentication, Authorization, and Accounting (AAA) protocol (e.g., such as may be used by one or more service providers) can be used to perform such policy, policing, metering, statistics collection, and all other information gathering based on communications made by a given wireless communication device in accordance with various aspects, embodiments, and/or examples of the invention. For example, information that is based on any embodiment of an AAA protocol may be used to enforce, track, and bill communication activities of the wireless communication device 151.

In an example of operation and implementation, WCAN device 120 supports communications with wireless communication devices 153, 154. The WCAN device 120 includes various components that, when appropriately configured, operate to effectuate certain operations and functions. Examples of such components within the WCAN device 120 may be found with reference to FIG. 8A and FIG. 8B (e.g., a WCAN device may include radio frequency (RF) circuitry, RF interface (I/F) circuitry, network communication circuitry, memory, and/or processing circuitry).

For example, the WCAN device 120 is configured to communicate with at least one wireless communication device (e.g., one or both of wireless communication devices 153, 154) using RF interface circuitry. Note that the RF interface (I/F) circuitry may itself include RF circuitry that is configured to support RF communications with one or more UEs (e.g., over the air) and/or alternatively include interface circuitry configured to communicate via one or more intervening components to an end component/device that includes RF circuitry that is configured to support RF communications with one or more UEs (e.g., over the air). For example, as described above, such a WCAN device 120 may be implemented in a variety of ways. For example, the WCAN device may itself include one or more components (e.g., one or more of antenna(s), antenna array(s), etc.) that are co-located with respect to the WCAN device 120 to effectuate wireless communications directly with one or more UEs and/or may communicate via one or more other components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) that are remotely-located with respect to the WCAN device 120 to effectuate wireless communications indirectly with one or more UEs. In one implementation, such RF interface (I/F) circuitry includes RF circuitry that is configured to support RF communications with one or more UEs (e.g., over the air); in this implementation, the RF interface (I/F) circuitry communicates directly with one or more UEs using RF circuitry implemented therein. In another one implementation, such RF interface (I/F) circuitry communicates with one or more other components that couple to and/or connect to an end component/device that includes RF circuitry that is configured to support RF communications with one or more UEs (e.g., over the air); in this implementation, the RF interface (I/F) circuitry communicates indirectly with the with one or more UEs via the one or more intervening components/devices.

Also, the WCAN device is configured to communicate with the cloud network 199, which may be implemented as an anchorless mobile backhaul communication system in some examples, using network communication circuitry. In some examples, the WCAN device 120 includes processing circuitry that is coupled to the RF interface circuitry, the network communication circuitry, and the memory. The processing circuitry of the WCAN device 120, when executing operational instructions stored in the memory, is configured to perform various operations and functions.

In an example, the WCAN device 120 is configured to retrieve a policy profile record associated with the wireless communication device 153 from the distributed cloud DB 190. The distributed cloud DB 190 may be distributedly implemented within the cloud network 199 (e.g., anchorless mobile backhaul communication system). Also, such a distributed cloud DB 190 may be implemented based on a DHT that is distrusted across a number of devices in the cloud network 199. Note that the distributed cloud DB 190 stores respective policy profile records for the wireless communication device 151-154 (and optionally other wireless communication devices not shown) and respective communications statistics records for the wireless communication devices 151-154 (and optionally other wireless communication devices not shown). When the wireless communication device 153 is associated with WCAN device 120, the WCAN device is configured to facilitate communications of the wireless communication device 153 in accordance with the policy profile record associated with the wireless communication device. Such communications may be Internet related communications with the Internet 195, UE-UE related communications to another wireless communication device (e.g., to wireless communication device 154 via the WCAN device 120 or to wireless communication device 152 the WCAN device 120 and also via the cloud network 199 via the WCAN device 110), and/or any combination thereof. When supporting such communications of the wireless communication device 153, the WCAN device 120 is configured to collect communications statistics based on those communications. Then, the WCAN device is configured to update the communications statistics record associated with the wireless communication device 153 within the distributed cloud DB 190 to include the communications statistics that are collected based on those communications. In some examples, the update process is performed using a create, read, update, delete (CRUD) process as may be performed in accordance with database management operations. For example, such a CRUD process includes four basic database operations that may performed in accordance with storage of information within persistent storage systems.

Figure 2:
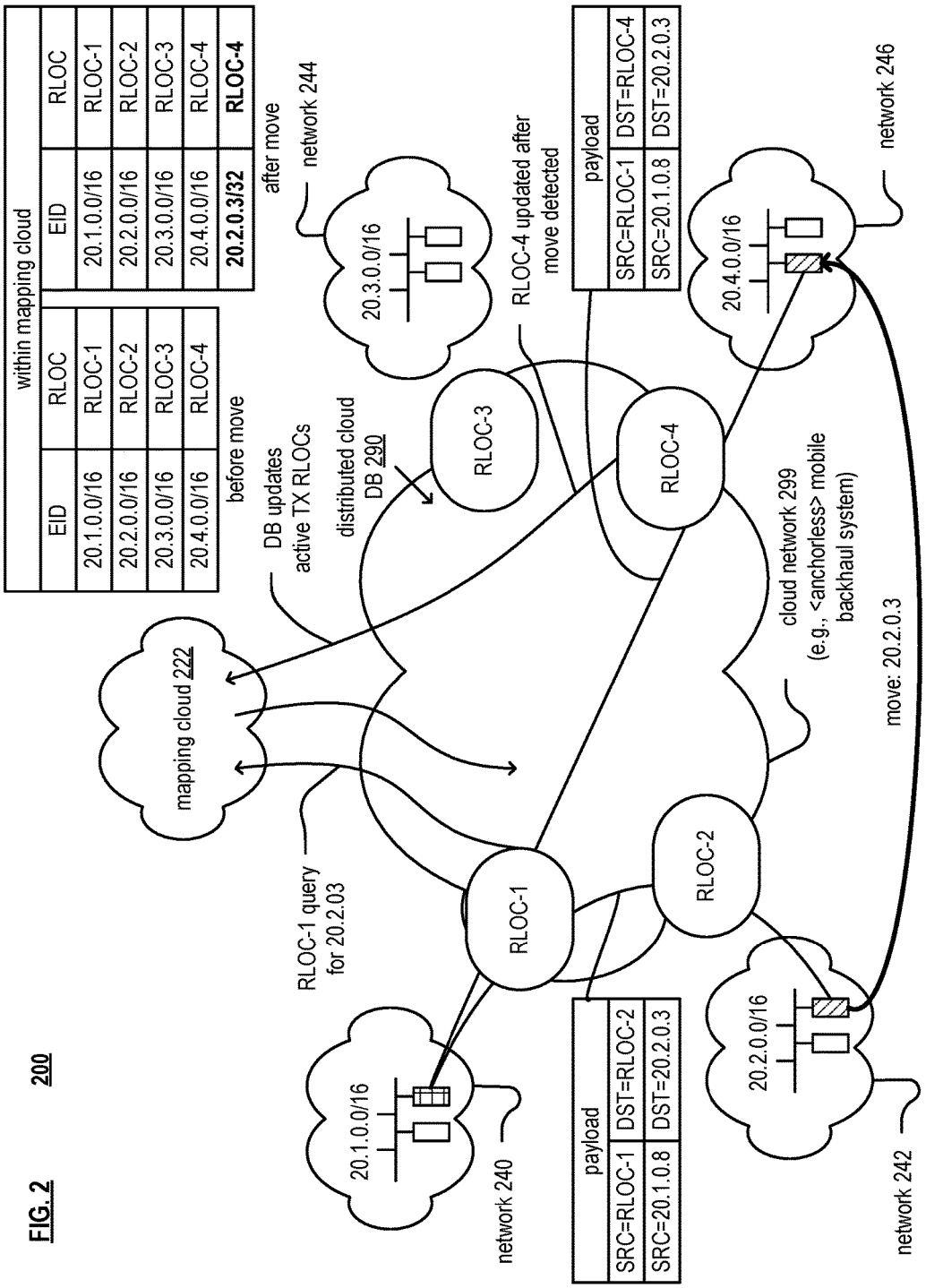
FIG. 2 is a diagram illustrating another embodiment of a communication system.

FIG. 2 is a diagram illustrating another embodiment 200 of a communication system. In some examples, the communication system of this diagram is implemented as an anchorless communication system that does not require general packet radio service (GPRS) tunneling protocol (GTP) procedures to effectuate communications to and from various UE. The communication system of this diagram includes a cloud network 299 that includes a distributed cloud DB 290 implemented across a number of devices therein. In an example, the distributed cloud DB 290 stores policy profile records and communications statistics records for various communication device that interact and communicate via the cloud network 299.

In some examples, the cloud network 299 may be implemented as an anchorless mobile backhaul communication system that provides mobile communication services to the wireless communication devices. In general, the cloud network 299 may be any communication system implemented to provide any desire communications between device.

In this diagram, each respective one of networks 240, 242, 244, and 246 has a respective associated address that in unique within the cloud network 299 (e.g., an Internet Protocol (IP) address), and each one of the networks 240-246 may also include some mechanism to identify uniquely the respective communication devices that communicate via that respective one of the networks 240-246 via the cloud network 299.

For example, one of the networks 240-246 may include a local area network (LAN), a wireless local area network (WLAN), etc. and a base station (BS) may have a unique address with respect to the cloud network 299, and the base station (BS) may include a network address translation mechanism such as may provide a unique wireless station (STA) identifiers (IDs) for each of the respective wireless stations (STAs) associated with the base station (BS). For another example, one of the networks 240-246 may include an Evolved Node B (eNodeB) that may have a unique address with respect to the cloud network 299, and the eNodeB may include a network address translation mechanism that provides a unique UE identifier for each of the UEs in communication with the eNodeB. In general, any of a number of types of networks (e.g., sub-networks, local networks, etc.) may interface and interact with the overall cloud network 299, and any of a number of types of communication devices may interact and communicate via the networks and via the cloud network 299.

In this embodiment 200, the cloud network 299 a number of route locators (RLOCs) implemented that are adaptive and configurable to effectuate communication pathways between various devices such as may be associated with different networks 240, 242, 244, and 246. In addition, a mapping cloud 222 is implemented as part of the cloud network 299 includes the current topology and mapping of the respectively RLOCs within the cloud network 299. In an example of operation and implementation, a communication device (shown as a diagonal-hashed device in network 242, such as having address 20.2.0.3) is associated with network 242 moves and associates with network 246. Prior to the move of the computing device from network 242 to network 246, within the mapping could 220, the End-point Identifiers (EIDs) as associated with the various RLOCs 1, 2, 3, and 4 (e.g., which may be IP addresses) have first values as identified in the table of upper right hand corner of the diagram. After the move of the computing device from network 242 to network 246, the EIDs as associated with the various RLOCs 1, 2, 3, and 4 have values as identified in the table. As can be seen, the RLOC-4 is updated after the move of the computing device is detected.

With respect to communications between the communication device (shown as the diagonal-hashed device in network 242, such as having address 20.2.0.3) to another communication device (e.g., shown as a cross-hashed device in network 240, such as having address 20.1.0.8) via the respective RLOCs in the cloud network 299, the payload of communications between the communication devices will specify source (SRC) and destination (DST) based on the current mapping included within mapping cloud. Before the move of the communication device between networks 242 to 246, based on the mapping cloud 222, the payload of communications between these communication devices will specify RLOC source and destination as SRC=RLOC-1 and DEST=RLOC-2 and specify communication device addresses as SRC=20.1.0.8 and DEST=20.2.0.3. Then, after the move of the communication device between networks 242 to 246, the mapping cloud 222 is updated and the payload of communications between these communication devices will specify RLOC source and destination as SRC=RLOC-1 and DEST=RLOC-4 and specify communication device addresses as SRC=20.1.0.8 and DEST=20.2.0.3. as can be seen, the respective RLOC mapping within the mapping cloud 222 is updated based on the updated locations of the respective communication devices as being associated with different respective networks associated with the cloud network 299.

One example implementation of the cloud with 299 may be made in accordance with a locator/identifier separation protocol (LISP). When comparing anchorless routing architectures to anchor-based architectures within communications systems, traditional routing architecture are implemented to use Internet Protocol (IP) addresses as both communication device identity and its respective location in the overall communication network. However, this tight coupling of the communication device identity and its location can be problematic and can be very difficult to implement. One example of an anchorless routing architecture within a communications system is based on LISP (or similar technologies) that establishes a new paradigm in which a communication device identity and its network location are split into two separate name spaces, namely, as End-point Identifiers (EID) and Route locators (RLOC). The EID-RLOC relationship is maintained and correlated via a dynamic mapping mechanism within the mapping cloud 222. Note that the RLOCs are tied to the network topology such as within the cloud network 299. These RLOCs represent various network components (e.g., network hardware, network switches, network routers, etc.) that are reachable via traditional routing within a communication system such as the cloud network 299.

The EIDs represent the communication devices (e.g., mobile end devices, cellular phones, wireless stations (STAs), etc.) that are reachable via different RLOCs based on their current respective network location where they get instantiated or activated. In accordance with a LISP implementation, the mapping cloud 222 based on the LISP implementation stores EID-RLOC mappings. Note that such as mapping cloud may be implemented similar to the distributed cloud DB 290 across multiple devices in the cloud network 299 in some examples, or alternatively implemented in a centralized DB. The mapping cloud 222 maintains a current/up to date EID-RLOC mapping, so that the communication devices having their respective EIDs can easily move between RLOCs while still maintaining effective communication via the overall cloud network 299. In an example, using such an anchorless architecture, various network technologies such as LISP implementation allow the EID name space associated with the respective communication devices to move easily without any impact to the core routing paths and connectivity between the RLOCs.

In some examples in which the cloud network 299 is based on a mobile backhaul communication system, the mobile backhaul communication system is implemented based on such a locator/identifier separation protocol (LISP) that specifies a dynamic mapping between a first name space corresponding to the devices (e.g., wireless communication devices, UEs, etc.) and a second name space corresponding to locations of those devices (e.g., wireless communication devices, UEs, etc.) based on the route locators (RLOCs) of the mobile backhaul communication system.

Figure 3A:
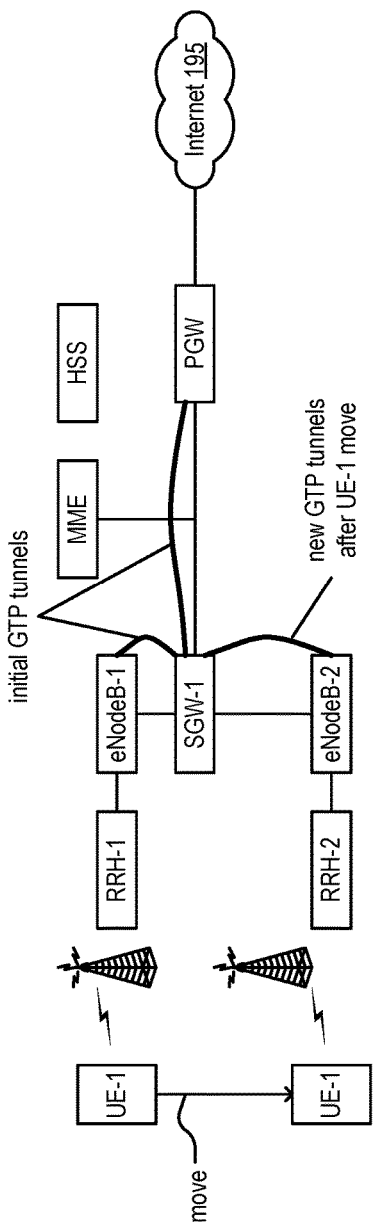
FIG. 3A is a diagram illustrating an embodiment of a communication system that is based on an anchored network configuration.
Figure 3B:
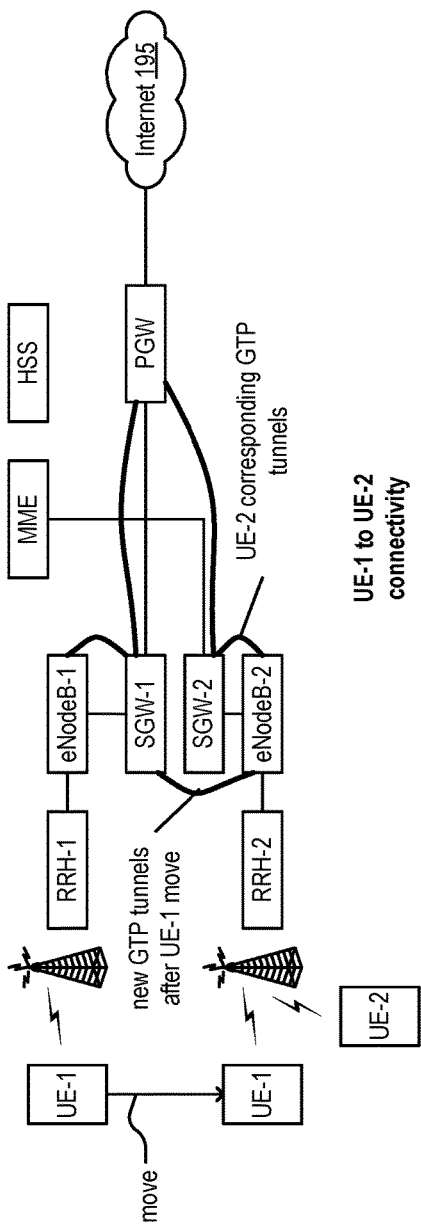
FIG. 3B is a diagram illustrating another embodiment of a communication system that is based on an anchored network configuration.

The following FIG. 3A and FIG. 3B show examples of communications based on an anchored network configuration that operate using general packet radio service (GPRS) tunneling protocol (GTP).

FIG. 3A is a diagram illustrating an embodiment 301 of a communication system that is based on an anchored network configuration. This diagram shows connectivity between a User Equipment (UE) (shown as UE-1) and the Internet 195. Note that a UE depicted in this disclosure may be of any of a variety of types including laptop computers, or tablets, personal digital assistants, personal computers, cellular telephones, smart phones, and/or any other wireless communication devices configured to communicate wirelessly with one or more of the WCAN devices, eNodeBs, and/or other devices configured to support wireless communications.

With respect to this diagram, UE-1 moves from being associated with a first eNodeB to a second eNodeB (from eNodeB-1 to eNodeB-2). Note that each respective eNodeB may have a corresponding remote radio head (RRH) (shown as RRH-1 and RRH-2). When the UE-1 associates with the eNodeB-1 (e.g., registers, authenticates, etc. with eNodeB-1), a service gateway (SGW) is setup using a dedicated component in the communication system that accesses information stored in a Mobility Management Entity (MME) (and also in a Home Subscriber Server (HSS) in some examples) to retrieve information pertaining to the UE-1 (e.g., AAA related information, account information, policy information, etc.) and to coordinate the handover of the UE-1 from the eNodeB-1 to the eNodeB-2. To support the communications, initial GTP tunnels are established to facilitate communications between the UE-1 and the Internet 195. Specifically, a first service gateway (SGW) (shown as SGW-1) is set up to facilitate communications via a packet data network gateway (PGW) to the Internet 195. The PGW serves as a gateway or interface between a mobile backhaul communication system and the Internet 195.

The initial GTP tunnels are set up between the UE-1 and the PGW via eNodeB-1 by the SGW-1. Then, after the UE-1 moves from a vicinity or coverage areas served by eNodeB-1 to another vicinity or coverage areas served by eNodeB-2, new GTP tunnels are set up between the UE-1 and the PGW via eNodeB-2 by the SGW-1. For each UE that communicates with the communication system, a corresponding GTP tunnel is formed.

FIG. 3B is a diagram illustrating another embodiment 302 of a communication system that is based on an anchored network configuration. This diagram shows connectivity between a first UE (shown as UE-1) and a second UE (shown as UE-2).

As the UE-1 had corresponding GTP tunnels set up between the UE-1 and the Internet 195 via eNodeB-1 by SGW-1, so does the UE-2 have corresponding GTP tunnels set up between the UE-2 and the Internet 195 via eNodeB-2 by SGW-2. As can be seen, a different respective corresponding GTP tunnel is formed between each of the UEs and the Internet 195 based on different respective SGWs. When UE-UE connectivity is made between UE-1 and UE-2 such as via the PGW, two entirely separate and distinct SGWs are implemented for each of the respective UEs, UE-1 and UE-2. As can be seen with respect to such a fixed anchor-based architecture using dedicated SGWs for each of the respective UEs, the pathways for data and/or control related information can be required to traverse significant portions and sometimes virtually all of the communication system.

When comparing such a fixed anchor-based architecture as with respect to FIG. 3A and FIG. 3B to an anchorless architecture such as with respect to FIG. 2, many improvements are provided based on an architecture. For example, considering a LISP implementation and based architecture provide one example of an anchorless architecture as an alternative to the GTP tunnels used for carrying user data traffic in a mobile backhaul communication system. An anchorless architecture provides a means to decouple the control and data planes within the mobile backhaul communication system. Also, an anchorless architecture provides a much decrease data path complexity as can be seen with respect to the data path following the most effective and efficient pathway as opposed to being required to travel through certain components (e.g., a PGW) and can oftentimes traverse significant portions of the mobile backhaul communication system (e.g., such as a trombone effect in the data plane). An anchorless architecture provides for increased data path efficiency and flexibility and also a decreased need for multilevel encapsulation when mobile functions are virtualised. Also, an anchorless architecture supports multiple gateways for the various UEs to allow data path to scale up easily. In addition, a cloud mapping system (e.g., mapping cloud 222 in FIG. 2) can easily spread traffic loads across the gateways. An anchorless architecture provides for a much more flexible data path and can eliminate anchor points in the data path when supporting communications between communication devices. From certain perspectives, an anchorless architecture obviates the need for anchor points within the mobile communication system. For example, mobile Internet Protocol (IP) anchor points can be problematic in terms of being scalability bottlenecks, introducing potential critical failure points, etc. An anchorless architecture provides for a very high degree of scalability and availability of a distributed DB that is adaptive, reconfigurable, and self-organizing.

Note however that anchor points within a fixed anchor-based architecture can nonetheless provide fixed, centralized points that may perform certain functions such as policing and enforcement of policy profiles including collection of statistics, metering, accounting, implementation of an Authentication, Authorization, and Accounting (AAA) protocol, etc.

Figure 4:
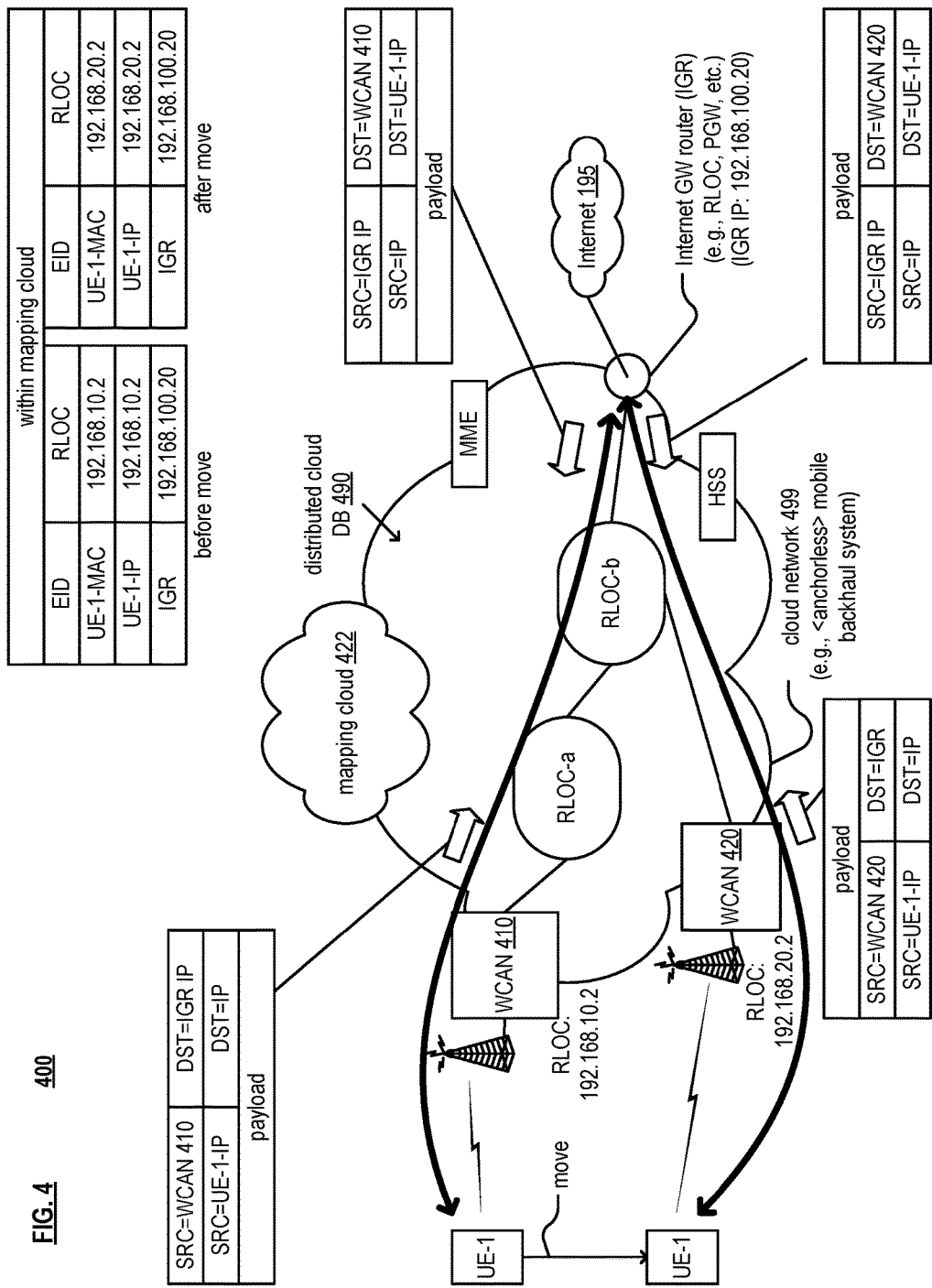
FIG. 4 is a diagram illustrating an embodiment of a communication system that based on an anchorless network configuration.

FIG. 4 is a diagram illustrating an embodiment 400 of a communication system that based on an anchorless network configuration. This diagram shows connectivity between a User Equipment (UE) (shown as UE-1) and the Internet 195. The communication system of this diagram includes a cloud network 499 that includes a distributed cloud DB 490 implemented across a number of devices therein. In an example, the distributed cloud DB 490 stores policy profile records and communications statistics records for various communication device that interact and communicate via the cloud network 499. Also, in an example, the cloud network 499 is implemented as an anchorless mobile backhaul communication system that provides mobile communication services to the wireless communication devices.

In this diagram, each respective one of WCAN devices 410 and 420 has a respective associated address that in unique within the cloud network 499 (e.g., a media access controller (MAC) address and/or an Internet Protocol (IP) address), and each one of the WCAN devices 410 and 420 may also include some mechanism to identify uniquely the respective communication devices that communicate via that respective one of the WCAN devices 410 and 420 via the cloud network 499.

In this embodiment 400, the cloud network 499 includes a number of route locators (RLOCs) (e.g., RLOC-a and RLOC-b) implemented that are adaptive and configurable to effectuate communication pathways between various devices such as may be associated with different WCAN devices 410 and 420. In addition, a mapping cloud 422 is implemented as part of the cloud network 499 includes the current topology and mapping of the respectively RLOCs within the cloud network 499. In an example of operation and implementation, a UE is associated with WCAN device 410 and moves and associates with WCAN device 420 (e.g., registers, authenticates, etc. with WCAN device 420).

Initially and prior to the move of the UE-1 from WCAN device 410 to WCAN device 420, the End-point Identifiers (EIDs) of the various RLOCs (e.g., RLOC-a, RLOC-b, and the Internet gateway router (IGR), which may be IP addresses) have first values as identified in the table of upper right hand corner of the diagram. After the move of the UE-1 from WCAN device 410 to WCAN device 420, the EIDs as associated with the various RLOCs (e.g., RLOC-a, RLOC-b, and the Internet gateway router (IGR)) have values as identified in the table. As can be seen in the table, the respective RLOC values for the EIDs are updated after the move of the UE-1 from WCAN device 410 to WCAN device 420.

With respect to Internet related communications between the UE-1 to the Internet via the respective WCAN devices and RLOCs in the cloud network 499, the payload of communications between the communication devices will specify source (SRC) and destination (DST) based on the current mapping included within mapping cloud. Before the move of the UE-1 from WCAN device 410 to WCAN device 420, the mapping cloud 422, the payload of communications from the UE-1 to the Internet 195 will specify RLOC source and destination as SRC=WCAN device 410 and DEST=IGR IP address and specify communication device addresses as SRC=UE-1-IP and DEST=IP. Conversely, the payload of communications from the Internet 195 to the UE-1 will specify RLOC source and destination as SRC=IGR IP address and DEST=WCAN device 410 and specify communication device addresses as SRC=IP and DEST=UE-1-IP.

Then, after the move of the UE-1 from WCAN device 410 to WCAN device 420, the mapping cloud 422 is updated and the payload of communications from the UE-1 to the Internet 195 will specify RLOC source and destination as SRC=WCAN device 420 and DEST=IGR IP address and specify communication device addresses as SRC=UE-1-IP and DEST=IP. Conversely, the payload of communications from the Internet 195 to the UE-1 will specify RLOC source and destination as SRC=IGR IP address and DEST=WCAN device 420 and specify communication device addresses as SRC=IP and DEST=UE-1-IP. As can be seen, the RLOC values are updated in the mapping cloud 422 based on which WCAN device the UE-1 is currently associated and via which WCAN device the UE-1 is currently communicating.

Figure 5:
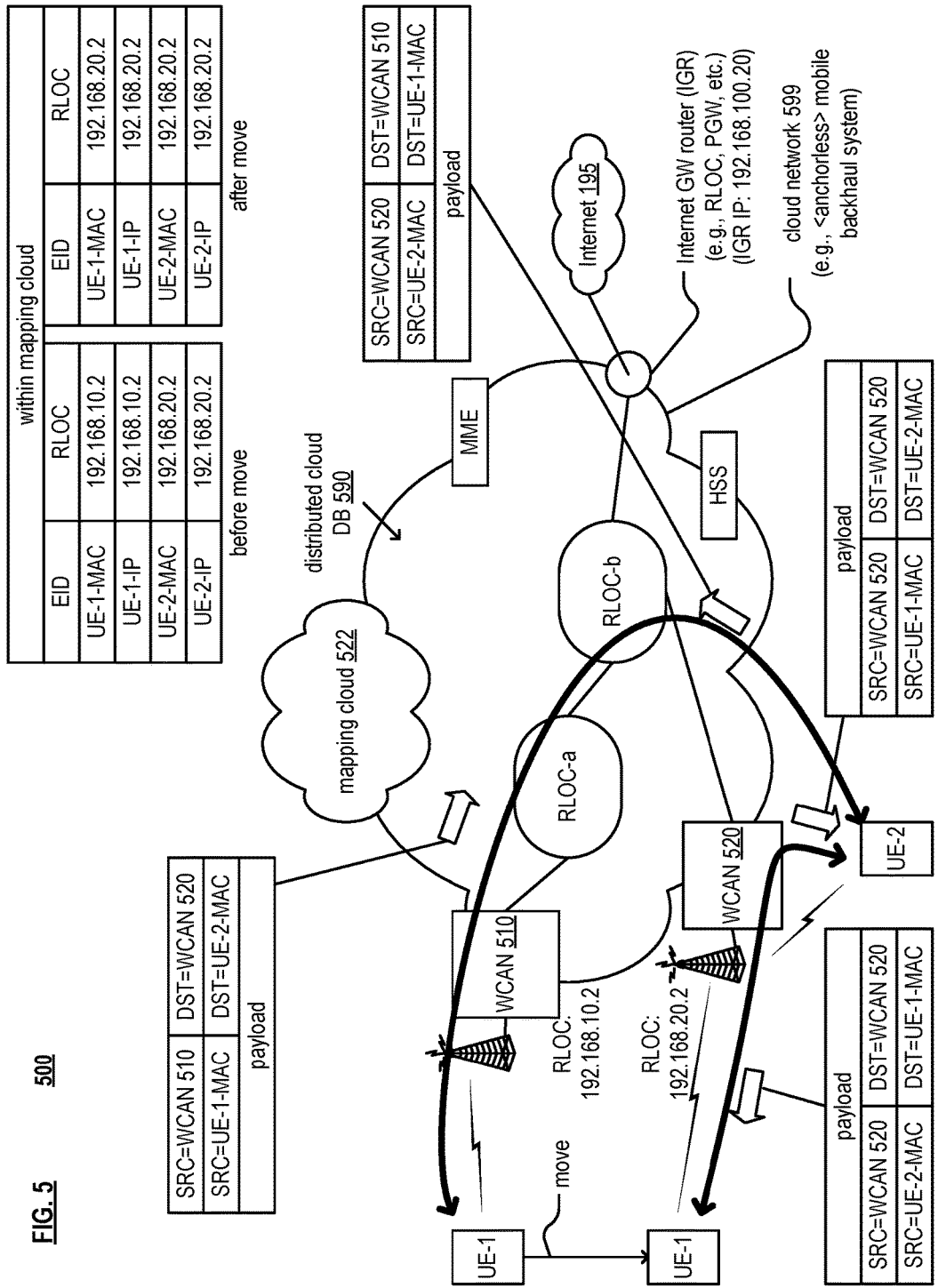
FIG. 5 is a diagram illustrating another embodiment of a communication system that based on an anchorless network configuration.

FIG. 5 is a diagram illustrating another embodiment 500 of a communication system that based on an anchorless network configuration. This diagram shows connectivity between a first UE (shown as UE-1) and a second UE (shown as UE-2).

In this embodiment 500, a cloud network 599 includes a number of route locators (RLOCs) (e.g., RLOC-a and RLOC-b) implemented that are adaptive and configurable to effectuate communication pathways between various devices such as may be associated with different WCAN devices 510 and 520. In addition, a mapping cloud 522 is implemented as part of the cloud network 599 includes the current topology and mapping of the respectively RLOCs within the cloud network 599. In an example of operation and implementation, a UE is associated with WCAN device 510 and moves and associates with WCAN device 520 (e.g., registers, authenticates, etc. with WCAN device 520) while having connectivity to UE-2.

Initially and prior to the move of the UE-1 from WCAN device 510 to WCAN device 520, the End-point Identifiers (EIDs) of the various RLOCs (e.g., RLOC-a, RLOC-b, and the Internet gateway router (IGR), which may be IP addresses) have first values as identified in the table of upper right hand corner of the diagram. After the move of the UE-1 from WCAN device 510 to WCAN device 520, the EIDs as associated with the various RLOCs (e.g., RLOC-a, RLOC-b, and the Internet gateway router (IGR)) have values as identified in the table. As can be seen in the table, the respective RLOC values for the EIDs are updated after the move of the UE-1 from WCAN device 510 to WCAN device 520, and specifically it can be seen that the EIDs of both the UE-1 and UE-2 have similar RLOC values after the move of the UE-1 from WCAN device 510 to WCAN device 520.

With respect to UE-UE related communications between the UE-1 to the UE-2 via the respective WCAN devices and RLOCs in the cloud network 599, the payload of communications between the communication devices will specify source (SRC) and destination (DST) based on the current mapping included within mapping cloud. Before the move of the UE-1 from WCAN device 410 to WCAN device 520, the mapping cloud 522, the payload of communications from the UE-1 to the UE-2 will specify RLOC source and destination as SRC=WCAN device 510 and DEST=WCAN device 520 and specify communication device addresses as SRC=UE-1-MAC and DEST=UE-2-MAC. Conversely, the payload of communications from the UE-2 to the UE-1 will specify RLOC source and destination as SRC=WCAN device 520 and DEST=WCAN device 510 and specify communication device addresses as SRC=UE-2-MAC and DEST=UE-1-MAC.

Then, after the move of the UE-1 from WCAN device 510 to WCAN device 520, the mapping cloud 522 is updated and the payload of communications from the UE-1 to UE-2 via the respective WCAN devices and RLOCs in the cloud network 599 will specify RLOC source and destination as SRC=WCAN device 520 and DEST=WCAN device 520 and specify communication device addresses as SRC=UE-1-MAC and DEST=UE-2-MAC. Conversely, the payload of communications from the UE-2 to the UE-1 will specify RLOC source and destination as SRC=WCAN device 520 and DEST=WCAN device 520 and specify communication device addresses as SRC=UE-2-MAC and DEST=UE-1-MAC.

In some examples, the WCAN device 520 is configured to facilitate first communications between the UE-2 and the UE-1 via the cloud network 599 that may be implemented as an anchorless mobile backhaul communication system in accordance with the policy profile record associated with the UE-2. Note that the UE-1 is configured to communicate with the cloud network 599 that may be implemented as an anchorless mobile backhaul communication system via WCAN device 510. Before a move of the UE-1 from the WCAN device 510 to the WCAN device 520, the WCAN device 520 is configured to collect first communications statistics based on first communications between the UE-2 and the UE-1. The WCAN device 520 is configured to update the communications statistics record associated with the UE-2 within the distributed cloud DB 590 to include the first communications statistics. Then, the WCAN device 520 is configured to perform a handover procedure of the UE-1 from the WCAN device 510 to the WCAN device 520 within the cloud network 599 that may be implemented as an anchorless mobile backhaul communication system.

Then, the WCAN device 520 is configured to retrieve a policy profile record associated with the UE-1 from the distributed cloud DB 590. The WCAN device 520 is then configured to facilitate second communications between the cloud network 599 that may be implemented as an anchorless mobile backhaul communication system via only the WCAN device 520 within the mobile backhaul communication system in accordance with the policy profile record associated with the UE-1 and the policy profile record associated with the UE-2. The WCAN device is configured to collect second communications statistics based on the second communications between the UE-2 and the UE-1. The WCAN device 520 is configured to update the communications statistics record associated with the UE-1 within the distributed cloud DB 590 to include the second communications statistics and also update the communications statistics record associated with the UE-2 within the distributed cloud DB 590 to include the second communications statistics. Based on the handover procedure of the UE-1 from the WCAN device 510 to the WCAN device 520, the WCAN device 520 initially performs all policy, policing, metering, statistics collection, and all other information gathering for only the UE-2, and then performs all policy, policing, metering, statistics collection, and all other information gathering for both the UE-2 and the UE-1 after the UE-1 has left the WCAN device 510 and associated with the WCAN device 520.

FIG. 6A is a diagram illustrating an example 601 of a hash function to generate keys based on identifiers in accordance with a Distributed Hash Table (DHT). Generally speaking, a hash function is a function that can be used to map data (e.g., identifiers, such as corresponding to UEs, wireless communication devices, etc.) to a predetermined number of keys (or hashes). Note that the identifiers may be respective unique values and may correspond to any arbitrary length or sized information. Some examples of identifiers within a mobile communication system context may include any one or more of unique identifiers associated with a UE or user such as any one or more of a User Equipment (UE), a username, a phone number, an International Mobile Subscriber Identity (IMSI), a International Mobile Equipment Identity (IMEI), a Universal Subscriber Identity Module (USIM), a Subscriber Identify Module/Universal Subscriber Identity Module (SIM/USIM), or a Subscriber Identify Module (SIM). Some examples of identifiers within a social media platform may be username (e.g., a Skype usernames, Facebook usernames, etc.). In general, such identifiers may be any value of any length or size. After undergoing the hash function, the identifiers are converted into keys (alternative referred to as hash values, hash codes, digests, etc.). The hash function allows for fast lookup of information within a Distributed Hash Table (DHT) or database that stores information.

In an example of operation and implementation, to locate information associated with a UE (e.g., a policy profile record associated with the UE), the hash function is applied to an identifier associated with the UE (e.g., such as any unique identifier of the UE or a user of the UE such as any such identifier described above) to generate a key of the identifier. The hash function provides for a preliminary search location, or an educated guess, as to where the information associated with the UE may be located within the DHT. Such a distributed cloud DB as described herein may be implemented as a DHT such that respective policy profile record associated with various UEs are stored across respective devices within a cloud network. In an example of a mobile backhaul communication system, the key resulting from the application of the hash function to an identifier associated with a UE may provide an IP address of a device on which a record associated with the UE is currently stored. Generally speaking, the keys that are generated based on the application of the hashing function are the result of the converting of the respective identifiers (again, which may be of various types, sizes, lengths, etc.) to one of a predetermined number of finite keys.

Referring back to the example of operation and implementation, note that sometimes the domain of the hash function is larger than the range, and more than one identifier may map to the same key (e.g., as shown in the diagram, both identifier 2 and identifier x map to the same key, 01). As such, each portion of the DHT (may be referred to as a slot) may include multiple data (e.g., multiple policy profile records associated with a subset of the UEs in the system, or alternatively a subset of the all of the policy profile records associated with all of the UEs in the system). Since the hash function provides a preliminary search location, or an educated guess, as to where the information associated with the UE may be located within the DHT, the hash function provides a key that is merely a starting point of where to begin looking for the information associated with the UE within the DHT. In some instances, the search process will fortunately begin looking in the location where the sought-after information is actually stored and located. However, in other instances, the search process will then proceed from the starting point of where to begin looking for the information associated with the UE within the DHT to one or more other subsequent locations as to where the information associated with the UE within the DHT is actually stored and located.

For example, consider that information is stored in the DHT across a number M (positive integer) of distributed computing devices, and each of those computing devices are assigned unique addresses (e.g., unique Internet Protocol (IP) addresses in the context of an IP addressed based communication network). Each respective computing device then establishes connectivity/tunnels to a number of K (positive integer) closest other of the computing devices that are distributedly implemented to effectuate the DHT. Note that the distance between any two computing device's unique addresses may be defined as a predetermined function D(a,b) of the two respective computing device's unique addresses. For example, D(a,b) can be defined as abs(a-b), mod(a,b), and/or any other desired distance function. Note that any of a variety of desired such 'distances' or functions are possible and may be used as desired in various embodiments.

To store information 'value', a message such as "put(key, identifier, value)" can then be made from any computing device by applying the hash function to an identifier to generate a key (e.g., key=hash(identifier)) and using that as an address and following the tunnels/connectivity to the computing device store that is closest to the key. The information 'value' is then stored at that identified computing device.

To retrieve information 'value', a message such as "get (key, identifier)" can then be made in a similar manner to find the computing device store having the address that is closest to the key. When the K-tunnels are properly arranged within the DHT, then the put/get operations only traverse a very few tunnels to find the correct computing device that stores the information to do the storing or form which the information is to be retrieved. New computing devices can be added as required, and the connectivity/tunnels are re-arranged to maintain the K closest.

In some examples, a distributed cloud DB as described herein is implemented as a DHT. For example, the distributed cloud DB, when implemented as a DHT, is distributedly implemented within the mobile backhaul communication system. The DHT stores policy profile record for devices (UEs, wireless communication devices, etc.) and communications statistics record for those devices.

In an example of operation and implementation, when a UE associates with a WCAN device (e.g., registers, authenticates, etc. with that WCAN device), that WCAN device processes an identifier associated with that UE based on a hash function that is associated with the DHT to generate a key associated with the UE. Then, the WCAN device identifies a communication device within the mobile backhaul communication system that stores the key associated with the UE and retrieves the policy profile record and/or the communications statistics record associated with the UE from that identified communication device.

For example, the WCAN device applies the hashing function of the DHT to the identifier of the UE that associates with the WCAN device to generate a key from the keyspace (e.g., finite listing of possible keys generated when the hashing function is applied to UE identifiers). To retrieve the policy profile record and/or the communications statistics record associated with that UE, that WCAN device will transmit a message (e.g., such as a get(key) message) to an initial device in the distributed cloud DB. If that initial device in the distributed cloud DB stores the policy profile record and/or the communications statistics record associated with that UE, it will return that (or those) to the WCAN device. Alternatively, if that initial device in the distributed cloud DB does not store the policy profile record and/or the communications statistics record associated with that UE, it will forward the message (e.g., such as a get(key) message) to another device in the distributed cloud DB as the search process continues. However, because of the hashing function operation and implementation of the DHT, the actual device that does store the policy profile record and/or the communications statistics record associated with that UE will be able to be found relatively quickly.

Then, after the WCAN device has updated the policy profile record and/or the communications statistics record associated with that UE, it will forward another message (e.g., such as a put(key, data) message, where data includes an updated policy profile record and/or communications statistics record associated with that UE) to the distributed cloud DB for storage therein to allow for its future access by the WCAN device and/or other WCAN device(s) operative within the cloud network.

Generally speaking, note that any device in the cloud network may be implemented to store some of the information associated with a distributed cloud DB as described is implemented as a DHT that stores information including policy profile records and/or the communications statistics records associated with one or more UEs. Examples of devices within the cloud network that may store at least a portion of the DHT include one or more of a WCAN device, a network router, a network switch, a data center, a cloud data storage device, and/or a route locator (RLOC), and/or any other device in the cloud network implemented and capability to communicate within the cloud network and store information.

In an example of operation and implementation, such a distributed cloud DB is implemented based on a Distributed Hash Table (DHT) that is distributedly implemented across a communication devices within a mobile backhaul communication system. Note that the DHT may be implemented across fewer than all of the devices in the mobile backhaul communication system in some implementations (e.g., a subset of the devices in the mobile backhaul communication system). When a WCAN device is supporting communications with a wireless communication device (e.g., a UE), the WCAN device is configured to process an identifier associated with the wireless communication device based on a hash function associated with the DHT to generate a key associated with the wireless communication device. Then, the WCAN device is configured to identify a communication device within the mobile backhaul communication system that stores the key associated with the wireless communication device. Once the appropriate communication device is identified, the WCAN device is configured to retrieve a policy profile record and/or a communications statistics record associated with the wireless communication device from that communication device. Note that the initially identified communication device may not actually be communication device from which the policy profile record and/or a communications statistics record associated with the wireless communication device is retrieved, as searching among the DHT may include a retrieval message being forwarded among more than one communication device in the search process.

FIG. 6B is a diagram illustrating an example 602 of a handover procedure between wireless communication access node (WCAN) devices within a communication system. In this embodiment 602, a cloud network 699 includes a number of route locators (RLOCs) (e.g., RLOC-a and RLOC-b) implemented that are adaptive and configurable to effectuate communication pathways between various devices such as may be associated with different WCAN devices 610 and 620. In addition, a mapping cloud 622 is implemented as part of the cloud network 699 includes the current topology and mapping of the respectively RLOCs within the cloud network 699.

This diagram shows connectivity that may be performed between a User Equipment (UE) (shown as UE-1) and the Internet 195 and/or any other devices in the communication system (e.g., including other UEs not specifically shown). The communication system of this diagram includes a cloud network 699 that includes a distributed cloud DB 690 implemented across a number of devices therein. In an example, the distributed cloud DB 690 stores policy profile records and communications statistics records for various communication device that interact and communicate via the cloud network 699. Also, in an example, the cloud network 699 is implemented as an anchorless mobile backhaul communication system that provides mobile communication services to the wireless communication devices.

In some examples, a distributed cloud DB 690 as described is implemented as a DHT that stores information including policy profile records and/or the communications statistics records associated with one or more UEs including UE-1 shown in this diagram for illustration. Such a DHT is implemented to store and keep track of user accounting records associated with UEs and/or users associated with the UEs.

In an example of operation and implementation, as shown with reference to step 1, the UE-1 associates with WCAN device 610 (e.g., registers, authenticates, etc. with WCAN device 610). Then, after completion of step 1, as shown with reference to step 2, when the WCAN device 610 is the initial/first WCAN device with which the UE-1 assists, the WCAN device 610 creates a record associated with the UE-1 (e.g., a structure that contains UE's policy profile and policing instructions, along with additional/optional fields to gather any other required information such as statistics, accounting, metering, etc.) and saves this record associated with the UE-1 in the distributed cloud DB 690 that stores information including policy profile records and/or the communications statistics records associated with one or more UEs. When the UE-1 is associated with the WCAN device 610, all policy, policing, metering, statistics collection, and all other information gathering are enforced and gathered by the WCAN device 610.

As shown with reference to step 3, when the UE-1 moves from a vicinity or region serviced by the WCAN device 610 to another vicinity or region serviced by the WCAN device 620, a handover procedure (step 4) is performed between the WCAN devices 610 and 620. However, the handover process is modified. The modified handover process operates such that when the WCAN device 610 relinquishes control over the UE-1, the WCAN device 610 updates the UE's record in the distributed cloud DB 690 (step 5). Then, when the WCAN device 620 takes over the UE-1, the WCAN device 620 retrieves the UE's record from the distributed cloud DB 690 and uses the distributed cloud DB 690 as the system of record. Then, when the UE-1 is associated with the WCAN device 620, all policy, policing, metering, statistics collection, and all other information gathering are enforced and gathered by the WCAN device 620. Then, the WCAN device 620 updates the UE's record in the distributed cloud DB 690 as new data is gathered for the operation of the UE-1 when it is associated with WCAN device 620.

With respect to such a handover procedure between WCAN devices servicing a UE, when the UE's record already exists in the distributed cloud DB 690, the WCAN device 610 retrieves the UE's record from the distributed cloud DB 690, and then performs all policy, policing, metering, statistics collection, and all other information gathering based on the UE's record. However, when the UE's record does not yet exist in the distributed cloud DB 690 (e.g., the WCAN device 610 is the initial the initial WCAN device is the first WCAN device with which the UE-1 associates), then the WCAN device 610 creates the UE's record. For example, the record may be generated to include policy profile related information retrieved from another device in the cloud network 699 (e.g., Mobility Management Entity (MME), Home Subscriber Server (HSS), and/or other source of such information in the system) and also communications statistics related information collected when supporting communications with the UE-1.

Also, note that regardless of the type of communications performed by the UE-1 (e.g., whether UE-UE related communications, UE-Internet related communications between the UE-1 and the Internet 195, etc.) the respective WCAN devices perform all policy, policing, metering, statistics collection, and all other information gathering based on the UE's record when the UE-1 is associated therewith. For example, when the UE-1 is associated with WCAN device 610, the WCAN device 610 performs all policy, policing, metering, statistics collection, and all other information gathering based on the UE's record. Then, when the UE-1 is associated with WCAN device 620, the WCAN device 620 performs all policy, policing, metering, statistics collection, and all other information gathering based on the UE's record. From certain perspectives, the operations with respect to the UE-s record may be viewed as a pull, update, and push process such that a WCAN device retrieves/pulls the UE's record from the distributed cloud DB 690, then performs all policy, policing, metering, statistics collection, and all other information gathering based on the UE's record including to update the UEs' record accordingly, and then pushing/storing the updated UE's record back to the distributed cloud DB 690. Then, the updated UE's record may undergo a similar process as performed by the same WCAN device (e.g., if the UE re-associates with that same WCAN device) or another WCAN device with which the UE associates.

Each of the following diagrams FIG. 7A-7E shows communications as supported between a UE-1 and the Internet 195 and/or another UE-2 via at least one WCAN device (e.g., WCAN device 710 or both WCAN device 710 and WCAN device 730) in accordance with a cloud network 799 (which may be implemented to as an anchorless mobile backhaul communication system). The WCAN device with which a given UE is associated performs all policy, policing, metering, statistics collection, and all other information gathering based on that UE's record.

FIG. 7A is a diagram illustrating an example 701 of a User Equipment (UE) accessing the Internet 195 via a WCAN device within a communication system. UE-1 associates with (e.g., registers, authenticates, etc.) WCAN device 710 and communicates with the Internet 195 via cloud network 799. When the UE-1 is associated with the WCAN device 710, the WCAN device 710 performs all policy, policing, metering, statistics collection, and all other information gathering based on the UE-1's record including updating that UE-1's record with respect to Internet related communications.

In some examples, the WCAN device 710 is configured to facilitate packet data network (PDN) (e.g., the Internet 195) communications between the UE-1 and the (e.g., the Internet 195) PDN via a mobile backhaul communication system that may be implemented as a cloud network 799. The WCAN device 710 is configured to collect PDN communications statistics based on the PDN communications between the UE-1 and the PDN (e.g., the Internet 195) and to update the communications statistics record associated with the UE-1 within a distributed cloud DB to include the PDN communications statistics.

FIG. 7B is a diagram illustrating an example 702 of a multiple UEs accessing the Internet 195 via a single WCAN device within a communication system. UE-1 associates with (e.g., registers, authenticates, etc.) WCAN device 710 and communicates with the Internet 195 via cloud network 799 while UE-2 also associates with (e.g., registers, authenticates, etc.) WCAN device 710 and communicates with the Internet 195 via cloud network 799. In this example, the WCAN device 710 performs all policy, policing, metering, statistics collection, and all other information gathering based on both the UE-1's record and the UE-2's record including updating that UE-1's record with respect to its respective Internet related communications and also updating that UE-2's record with respect to its respective Internet related communications. In general, a given WCAN device is configured to perform such operations with respect to more than one UE that is currently associated therewith.

FIG. 7C is a diagram illustrating an example 703 of a UE-UE connectivity supported via multiple WCAN devices within a communication system. When supporting such UE-UE connectivity with respect to this diagram, UE-1 associates with (e.g., registers, authenticates, etc.) WCAN device 710, and UE-2 associates with (e.g., registers, authenticates, etc.) WCAN device 720. In accordance with this particular mode of UE-UE connectivity, the WCAN device 710 performs all policy, policing, metering, statistics collection, and all other information gathering based on the UE-1's record, and the WCAN device 720 performs all policy, policing, metering, statistics collection, and all other information gathering based on the UE-2's record.

In some examples, the WCAN device 710 is configured to facilitate communications between the UE-1 and the UE-2 via a mobile backhaul communication system that may be implemented as a cloud network 799 in accordance with a policy profile record associated with the UE-1. Note that the UE-2 is configured to communicate a mobile backhaul communication system that may be implemented as a cloud network 799 via WCAN device 720. The WCAN device 710 is configured to collect communications statistics based on the communications between UE-1 and the UE-2 via a mobile backhaul communication system that may be implemented as a cloud network 799. Then, the WCAN device 710 is configured to update the communications statistics record associated with the UE-1 within a distributed cloud database to include the communications statistics associated with the communications between UE-1 and the UE-2.

FIG. 7D is a diagram illustrating an example 704 of a UE-UE connectivity supported via a single WCAN device within a communication system. When supporting such UE-UE connectivity with respect to this diagram, both the UE-1 and the UE-2 associate with (e.g., registers, authenticates, etc.) WCAN device 710. In accordance with this particular mode of UE-UE connectivity, the WCAN device 710 performs all policy, policing, metering, statistics collection, and all other information gathering based on both the UE-1's record and the UE-2's record. With respect to this particular mode of UE-UE connectivity, note that the data path of communications need not traverse any portion of the cloud network 799 beyond the WCAN device 710. That is, the data path of communications between the UE-1 and the UE-2 traverse through the WCAN device 710 without traversing other portions of the cloud network 799.

FIG. 7E is a diagram illustrating an example 705 of a UE supporting communicating via different WCAN devices based on movement of the UE within a communication system. At or during a time 1 (or during a Delta T1), UE-1 associates with (e.g., registers, authenticates, etc.) WCAN device 710 and communicates with the via cloud network 799 (e.g., to the Internet 195 and/or to another UE such as may be associated with another WCAN device). The WCAN device 710 performs all policy, policing, metering, statistics collection, and all other information gathering based on the UE-1's record when the UE-1 is associated with the WCAN device 710. Then, the UE-1 moves from a vicinity or region serviced by the WCAN device 710 to another vicinity or region serviced by the WCAN device 720, and then at or during a time 2 (or during a Delta T2), UE-1 associates with (e.g., registers, authenticates, etc.) WCAN device 720 and communicates with the via cloud network 799 (e.g., to the Internet 195 and/or to another UE such as may be associated with another WCAN device). The WCAN device 720 performs all policy, policing, metering, statistics collection, and all other information gathering based on the UE-1's record when the UE-1 is associated with the WCAN device 720.

FIG. 8A is a diagram illustrating an embodiment 801 of a WCAN device. A high-level description of a WCAN device that may be operative and/or implemented within various embodiments of a communication system as described above is illustrated. The WCAN device generally includes a control system 860, a baseband processor 850, memory 852, transmit (TX) circuitry 856, receive (RX) circuitry 854, multiple antennas 814, and one or more communication interfaces that can include a network interface 858, or subsets and variations thereof. The memory 852 may be any type of memory capable of storing software and/or data. The receive (RX) circuitry 854 is configured to receive radio frequency signals bearing information from one or more remote UE's (e.g., such as described with reference to FIG. 9A and/or FIG. 9B). In some examples, a low noise amplifier and a filter (not shown) cooperate to amplify and remove broadband interference from the signal for processing. down-conversion and digitization circuitry (not shown) will then down convert the filtered, received signal to an intermediate or baseband frequency signal, which is then digitized into one or more digital streams.

The baseband processor 850 is configured to process the digitized received signal to extract the information or data bits conveyed in the received signal. In some examples, this processing typically comprises demodulation, decoding, and error correction operations. In certain implementations, the baseband processor 850 is implemented in one or more digital signal processors (DSPs), application specific integrated circuits (ASICs), and/or both. The received information is then sent to an associated network via the network interface 858 or transmitted to another User Equipment (UE), mobile terminal, etc. serviced by the WCAN device.

On the transmit side, the baseband processor 850 receives digitized data, which may represent voice, data, control information, and/or other information, from the network interface 858 under the control of the control system 860, and encodes the data for transmission. The encoded data is output to the transmit (TX) circuitry 856, where it is modulated by a carrier signal having a desired transmit frequency or frequencies.

The baseband processor 850 may be configured to perform encoding of one or more bits to generate one or more coded bits used to generate the modulation data (or generally, data). For example, the baseband processor 850 may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

A power amplifier (not shown) will amplify the modulated carrier signal to a level appropriate for transmission, and deliver the modulated carrier signal to the antennas 814 through a matching network (not shown). In one embodiment of the present disclosure, the WCAN device transmits signals using both antennas 814, but receives signals using a single antenna 814. In general, any desired configuration or mode of the operation of the one or more antennas 814 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

Note that other such transmit/receive circuitry as described with respect to this WCAN device may be implemented for optical, digital subscriber line (DSL), or any other communication scheme. For example, when collocated with a transmit/receive point, a central access unit such as a WCAN device could reuse the baseband processor and other components of the transmit/receive point as necessary (e.g. interfaces for communicating with other transmit/receive points).

FIG. 8B is a diagram illustrating another embodiment 802 of a WCAN device 810. The WCAN device 810 includes a communication interface 820 to perform transmitting and/or receiving of at least one signal, symbol, packet, frame, etc. (note that general reference to packet or frame may be used interchangeably). In some examples, the communication interface 820 is implemented to include radio frequency (RF) interface (I/F) circuitry 826 (e.g., using a transmitter (TX) 827 and a receiver (RX) 828, which may be separate circuitry, modules, etc. or may be integrated into and part of the RF interface (I/F) circuitry 826) and network communication circuitry 822 (e.g., using a transmitter (TX) 823 and a receiver (RX) 824, which may be separate circuitry, modules, etc. or may be integrated into and part of the network communication circuitry 822)).

The RF interface (I/F) circuitry 826 is configured to support wireless communication with one or more UEs (e.g., via one or more antennas, remote radio heads (RRHs), transmit/receive (TX/RX) points, etc. and/or one or more base stations (BSs), Evolved Nodes B (eNodeBs), etc.). The network communication circuitry is configured to support communications (e.g., wirelessly, wire line based, optically, etc.) with a cloud network 899 (e.g., such as a mobile backhaul communication system that may be implemented as an anchorless mobile backhaul communication system including with respect to other examples and embodiments herein).

Generally speaking, the communication interface 820 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the WCAN device 810 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the WCAN device 810 also includes a processing circuitry 830, and an associated memory 840, to execute various operations including interpreting at least one signal, symbol, packet, and/or frame transmitted to wireless communication device 890 (e.g., a UE) and/or wireless communication device 891 (e.g., another UE) and/or received from the wireless communication device 890 and/or wireless communication device 891 (e.g., UEs). The WCAN device 810 and wireless communication device 890 (and/or 891) may be implemented using at least one integrated circuit in accordance with any desired configuration or combination of components, modules, etc. within at least one integrated circuit. Also, the WCAN device 810 and wireless communication device 890 (and/or 891) may each include one or more antennas for transmitting and/or receiving of at least one packet and/or frame (e.g., wireless communication device 890 may include m antennas, and wireless communication device 891 may include n antennas, where m and n are positive integers and may be the same positive integer or different positive integers).

Also, in some examples, note that one or more of the processing circuitry 830, the communication interface 820 (including the respective TX(s) and/or RX(s) thereof), and/or the memory 840 may be implemented in one or more "processing modules," "processing circuits," "processors," and/or "processing units" or their equivalents. Considering one example, a system-on-a-chip (SOC) 830a may be implemented to include functionality as performed by the processing circuitry 830, the communication interface 820 (including the respective TX(s) and/or RX(s) thereof), and the memory 840 (e.g., SOC 330a being a multifunctional, multi-module integrated circuit that includes multiple components therein). Considering another example, processing-memory circuitry 830b may be implemented to include functionality as performed by the processing circuitry 830 and the memory 840 yet the communication interface 820 is a separate circuitry (e.g., processing-memory circuitry 830b is a single integrated circuit that performs functionality of a processing circuitry and a memory and is coupled to and also interacts with the communication interface 820).

Considering even another example, two or more processing circuitries may be implemented to include the processing circuitry 830, the communication interface 820 (including the respective TX(s) and/or RX(s) thereof), and the memory 840. In such examples, such a "processing circuitry" or "processing circuitries" (or "processor" or "processors") is/are configured to perform various operations, functions, communications, etc. as described herein. In general, the various elements, components, etc. shown within the device 810 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the WCAN device 810 includes both processing circuitry 830 and communication interface 820 configured to perform various operations. In other examples, the WCAN device 810 includes SOC 830a configured to perform various operations. In even other examples, the WCAN device 810 includes processing-memory circuitry 830b configured to perform various operations. Generally, such operations include generating, transmitting, etc. signals intended for one or more other devices (e.g., wireless communication devices 890 through 891) and receiving, processing, etc. other signals received for one or more other devices (e.g., wireless communication devices 890 through 891).

In some examples, note that the communication interface 820, which is coupled to the processing circuitry 830, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 810 may be communicated via any of these types of communication systems.

FIG. 9A is a diagram illustrating an embodiment 901 of a wireless communication device (e.g., a User Equipment (UE)). A high-level description of the components of a UE shown. Similarly, to the transmit/receive point 1102, the UE 1202 will include a control system 960, a baseband processor 950, memory 952, transmit (TX) circuitry 956, receive (RX) circuitry 954, multiple antennas 914, and user interface circuitry 958, or subsets and variations thereof. The receive circuitry 1224 receives radio frequency signals bearing information from one or more WCAN devices. In some examples, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 950 processes the digitized received signal to extract the information or data bits conveyed in the received signal. In some examples, this processing typically comprises demodulation, decoding, and error correction operations. In certain implementations, the baseband processor 950 is implemented in one or more digital signal processors (DSPs), application specific integrated circuits (ASICs), and/or both.

For transmission, the baseband processor 950 receives digitized data, which may represent voice, data, control information, and/or other information, from the control system 960 and/or the user interface circuitry 958, which it encodes for transmission. The encoded data is output to the transmit circuitry 956, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 914 through a matching network (not shown). The UE may receive signals using both antennas 914, but transmits signals using a single antenna 914.

In orthogonal frequency division multiplexing (OFDM) modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block. Otherwise SC-FDMA modulation is otherwise similar to OFDM modulation.

OFDM is used for at least the downlink transmission from WCAN devices to UEs. For example, each WCAN device may be equipped with n transmit antennas 814, and each UE is equipped with m receive antennas 914. Notably, the respective antennas can be used for reception and transmission using appropriate duplexers or switches and are so labeled only for clarity. Also, in general, any desired configuration or mode of the operation of the one or more antennas 914 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

FIG. 9B is a diagram illustrating another embodiment 902 of a wireless communication device (e.g., a UE). A wireless communication device 910 (e.g., which may be any UE such as described herein including with reference to FIG. 1) is in communication with another wireless communication device 990 (and/or any number of other wireless communication devices up through another wireless communication device 991) via a transmission medium. In some examples, the wireless communication device 990 is a WCAN device, and/or the wireless communication device 991 is another WCAN device. The wireless communication device 910 includes radio frequency (RF) interface (I/F) circuitry 920 to perform wireless transmitting and/or receiving of at least one signal, symbol, packet, frame, etc. (e.g., using a transmitter (TX) 922 and a receiver (RX) 924, which may be separate circuitry, modules, etc. or may be integrated into and part of the RF interface (I/F) circuitry 920) (note that general reference to packet or frame may be used interchangeably).

Generally speaking, the RF interface (I/F) circuitry 920 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 910 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 910 also includes a processing circuitry 930, and an associated memory 940, to execute various operations including interpreting at least one signal, symbol, packet, and/or frame transmitted to wireless communication device 990 and/or received from the wireless communication device 990 and/or wireless communication device 991. The wireless communication devices 910 and 990 (and/or 991) may be implemented using at least one integrated circuit in accordance with any desired configuration or combination of components, modules, etc. within at least one integrated circuit.

Also, the wireless communication devices (WDEVs) 910, 990, and/or 991 may each include or be coupled to one or more antennas [such as x antennas for WDEV 990 and y antennas for WDEV 991, where x and y are positive integers and may be the same positive integer or different positive integers] remote radio heads (RRHs), transmit/receive (TX/RX) points, etc. and/or one or more base stations (BSs), eNodeBs, etc. for transmitting and/or receiving of at least one packet and/or frame.

Also, in some examples, note that one or more of the processing circuitry 930, the RF interface (I/F) circuitry 920 (including the TX 922 and/or RX 924 thereof), and/or the memory 940 may be implemented in one or more "processing modules," "processing circuits," "processors," and/or "processing units" or their equivalents. Considering one example, a system-on-a-chip (SOC) 930a may be implemented to include the processing circuitry 930, the RF interface (I/F) circuitry 920 (including the TX 922 and/or RX 924 thereof), and the memory 940 (e.g., SOC 330a being a multifunctional, multi-module integrated circuit that includes multiple components therein). Considering another example, processing-memory circuitry 930b may be implemented to include functionality as performed by the processing circuitry 930 and the memory 940 yet the RF interface (I/F) circuitry 920 is a separate circuitry (e.g., processing-memory circuitry 930b is a single integrated circuit that performs functionality of a processing circuitry and a memory and is coupled to and also interacts with the RF interface (I/F) circuitry 920).

Considering even another example, two or more processing circuitries may be implemented to include the processing circuitry 930, the RF interface (I/F) circuitry 920 (including the TX 922 and/or RX 924 thereof), and the memory 940. In such examples, such a "processing circuitry" or "processing circuitries" (or "processor" or "processors") is/are configured to perform various operations, functions, communications, etc. as described herein. In general, the various elements, components, etc. shown within the device 910 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 910 includes both processing circuitry 930 and RF interface (I/F) circuitry 920 configured to perform various operations. In other examples, the device 910 includes SOC 930a configured to perform various operations. In even other examples, the device 910 includes processing-memory circuitry 930b configured to perform various operations. Generally, such operations include generating, transmitting, etc. signals intended for one or more other devices (e.g., device 990 through 991) and receiving, processing, etc. other signals received for one or more other devices (e.g., device 990 through 991).

In some examples, note that the wireless communication device 910 includes a communication interface that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 910 may be communicated via any of these types of communication systems.

FIG. 10A is a diagram illustrating an embodiment of a method 1001 for execution by one or more communication devices. In some examples, the method 1001 is executed by a WCAN device that includes radio frequency (RF) interface (I/F) circuitry and network communication circuitry. In an example of operation and implementation, the method 1001 begins by communicating with a wireless communication device (e.g., using radio frequency (RF) circuitry of the WCAN device) (block 1010). The method 1001 continues by communicating with a mobile backhaul communication system (using network communication circuitry of the WCAN device) (block 1020).

The method 1001 then operates by retrieving a policy profile record associated with the wireless communication device from a distributed cloud database that is distributedly implemented within the mobile backhaul communication system (block 1030). In some examples, the distributed cloud database stores policy profile records for various wireless communication devices including the policy profile record associated with the wireless communication device and also stores communications statistics records for the various wireless communication devices including a communications statistics record associated with the wireless communication device.

The method 1001 continues by facilitating communications of the wireless communication device in accordance with the policy profile record associated with the wireless communication device (block 1040). The method 1001 then operates by collecting communications statistics based on the communications of the wireless communication device (block 1050). The method 1001 continues by updating the communications statistics record associated with the wireless communication device within the distributed cloud database to include the communications statistics that are collected based on the communications of the wireless communication device (block 1060).

FIG. 10B is a diagram illustrating another embodiment of a method 1002 for execution by one or more communication devices. The method 1002 may be executed in cooperation with the method 1002 of FIG. 10A in some embodiments. With respect to the method 1002, the distributed cloud database is implemented based on a Distributed Hash Table (DHT) that is distributedly implemented across various communication devices within the mobile backhaul communication system.

The method 1002 begins by processing an identifier associated with the wireless communication device based on a hash function associated with the DHT to generate a key associated with the wireless communication device (block 1011). The method 1002 continues by identifying a communication device of the plurality of communication devices within the mobile backhaul communication system that stores the key associated with the wireless communication device (block 1021). Then, the method 1002 then operates by retrieving the policy profile record associated with the wireless communication device and/or the communications statistics record associated with the wireless communication device from the communication device within the mobile backhaul communication system that is identified (block 1031).

It is noted that the various operations and functions described within various methods herein may be performed within a communication device and/or wireless communication device (e.g., such as by a WCAN device, a UE, and/or other communication device and such operations may be performed by a processing circuitry, a communication interface, and a memory as may be implemented in any of a variety of configurations) and/or other components therein. Generally, a communication interface and processing circuitry (or alternatively a processing circuitry that includes communication interface functionality, components, circuitry, etc.) in a communication device and/or wireless communication device can perform such operations.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication access node (WCAN) device comprising:
    radio frequency (RF) interface circuitry configured to communicate with a wireless communication device;
    network communication circuitry configured to communicate with an anchorless mobile backhaul communication system operating under a locator/identifier separation protocol (LISP);
    memory that stores operational instructions; and processing circuitry that is coupled to the RF interface circuitry, the network communication circuitry, and the memory, wherein the processing circuitry, when executing the operational instructions, is configured to:
retrieve a policy profile record associated with the wireless communication device from a distributed cloud database that is distributedly implemented within the anchorless mobile backhaul communication system, wherein the distributed cloud database stores a plurality of policy profile records for a plurality of wireless communication devices including the policy profile record associated with the wireless communication device and a plurality of communications statistics records for the plurality of wireless communication devices including a communications statistics record associated with the wireless communication device;
facilitate communications of the wireless communication device in accordance with the policy profile record associated with the wireless communication device;
collect communications statistics based on the communications of the wireless communication device; and
update the communications statistics record associated with the wireless communication device within the distributed cloud database to include the communications statistics that are collected based on the communications of the wireless communication device.

2. The WCAN device of claim 1, wherein the distributed cloud database is implemented based on a Distributed Hash Table (DHT) that is distributedly implemented across a plurality of communication devices within the anchorless mobile backhaul communication system, and wherein the processing circuitry, when executing the operational instructions, is further configured to:
process an identifier associated with the wireless communication device based on a hash function associated with the DHT to generate a key associated with the wireless communication device;
identify a communication device of the plurality of communication devices within the anchorless mobile backhaul communication system that stores the key associated with the wireless communication device; and
retrieve at least one of the policy profile record associated with the wireless communication device or the communications statistics record associated with the wireless communication device from the communication device of the plurality of communication devices within the anchorless mobile backhaul communication system that is identified.

3. The WCAN device of claim 1, wherein the processing circuitry, when executing the operational instructions, is further configured to:
facilitate packet data network (PDN) communications between the wireless communication device and a PDN via the anchorless mobile backhaul communication system;
collect PDN communications statistics based on the PDN communications between the wireless communication device and the PDN; and
update the communications statistics record associated with the wireless communication device within the distributed cloud database to include the PDN communications statistics.

4. The WCAN device of claim 1, wherein the processing circuitry, when executing the operational instructions, is further configured to:
facilitate other communications between the wireless communication device and another wireless communication device via the anchorless mobile backhaul communication system in accordance with the policy profile record associated with the wireless communication device, wherein the another wireless communication device is configured to communicate with the anchorless mobile backhaul communication system via another WCAN device;
collect other communications statistics based on the other communications between the wireless communication device and the another wireless communication device; and
update the communications statistics record associated with the wireless communication device within the distributed cloud database to include the other communications statistics.

5. The WCAN device of claim 1, wherein the processing circuitry, when executing the operational instructions, is further configured to:
facilitate first communications between the wireless communication device and another wireless communication device via the anchorless mobile backhaul communication system in accordance with the policy profile record associated with the wireless communication device, wherein the another wireless communication device is configured to communicate with the anchorless mobile backhaul communication system via another WCAN device;
collect first communications statistics based on the first communications between the wireless communication device and the another wireless communication device;
update the communications statistics record associated with the wireless communication device within the distributed cloud database to include the first communications statistics;
perform a handover procedure of the another wireless communication device from the another WCAN device within the anchorless mobile backhaul communication system to the WCAN device;
retrieve another policy profile record associated with the another wireless communication device from the distributed cloud database that is distributedly implemented within the anchorless mobile backhaul communication system;
facilitate second communications between the wireless communication device and the another wireless communication device via only the WCAN device within the anchorless mobile backhaul communication system in accordance with the policy profile record associated with the wireless communication device and the another policy profile record associated with the another wireless communication device;
collect second communications statistics based on the second communications between the wireless communication device and the another wireless communication device;
update the communications statistics record associated with the wireless communication device within the distributed cloud database to include the second communications statistics; and
update another communications statistics record associated with the another wireless communication device within the distributed cloud database to include the second communications statistics.

6. The WCAN device of claim 1, wherein the anchorless mobile backhaul communication system operating the LISP) protocol specifies a dynamic mapping between a first name space corresponding to the plurality of wireless communication devices and a second name space corresponding to locations of the plurality of wireless communication devices based on a plurality of route locators (RLOCs) of the mobile backhaul communication system.

7. The WCAN device of claim 1, wherein:
the distributed cloud database is distributedly implemented across a plurality of communication devices within the anchorless mobile backhaul communication system; and
the plurality of communication devices includes at least one of the WCAN device, a network router, a network switch, a data center, a cloud data storage device, or a route locator (RLOC).

8. The WCAN device of claim 1 further comprising:
a base station, a distributed base station, an Evolved Node B (eNodeB), a Home Evolved Node B (Home eNodeB), or a 5G Evolved Node B (gNodeB), and wherein the wireless communication device includes a User Equipment (UE).

9. A wireless communication access node (WCAN) device comprising:
radio frequency (RF) interface circuitry configured to communicate with a wireless communication device;
network communication circuitry configured to communicate with an anchorless mobile backhaul communication system operating under a locator/identifier separation protocol (LISP);
memory that stores operational instructions; and
processing circuitry that is coupled to the RF interface circuitry, the network communication circuitry, and the memory, wherein the processing circuitry, when executing the operational instructions, is configured to:
retrieve a policy profile record associated with the wireless communication device from a Distributed Hash Table (DHT) that is distributedly implemented across a plurality of communication devices within the anchorless mobile backhaul communication system, wherein the DHT stores a plurality of policy profile records for a plurality of wireless communication devices including the policy profile record associated with the wireless communication device and a plurality of communications statistics records for the plurality of wireless communication devices including a communications statistics record associated with the wireless communication device;
retrieve at least one of the policy profile record associated with the wireless communication device or the communications statistics record associated with the wireless communication device from communication device of the plurality of communication devices within the anchorless mobile backhaul communication system that is identified based on the DHT;
facilitate communications of the wireless communication device in accordance with the policy profile record associated with the wireless communication device;
collect communications statistics based on the communications of the wireless communication device; and
update the communications statistics record associated with the wireless communication device within the DHT to include the communications statistics that are collected based on the communications of the wireless communication device.

10. The WCAN device of claim 9, wherein the processing circuitry, when executing the operational instructions, is further configured to:
facilitate first communications between the wireless communication device and another wireless communication device via the anchorless mobile backhaul communication system in accordance with the policy profile record associated with the wireless communication device, wherein the another wireless communication device is configured to communicate with the anchorless mobile backhaul communication system via another WCAN device;
collect first communications statistics based on the first communications between the wireless communication device and the another wireless communication device;
update the communications statistics record associated with the wireless communication device within the DHT to include the first communications statistics;
perform a handover procedure of the another wireless communication device from the another WCAN device within the anchorless mobile backhaul communication system to the WCAN device;
retrieve another policy profile record associated with the another wireless communication device from the DHT that is distributedly implemented within the anchorless mobile backhaul communication system;
facilitate second communications between the wireless communication device and the another wireless communication device via only the WCAN device within the anchorless mobile backhaul communication system in accordance with the policy profile record associated with the wireless communication device and the another policy profile record associated with the another wireless communication device;
collect second communications statistics based on the second communications between the wireless communication device and the another wireless communication device;
update the communications statistics record associated with the wireless communication device within the DHT to include the second communications statistics; and
update another communications statistics record associated with the another wireless communication device within the DHT to include the second communications statistics.

11. The WCAN device of claim 9, wherein the anchorless mobile backhaul communication system operating under the LISP) protocol specifies dynamic mapping between a first name space corresponding to the plurality of wireless communication devices and a second name space corresponding to locations of the plurality of wireless communication devices based on a plurality of route locators (RLOCs) of the anchorless mobile backhaul communication system.

12. The WCAN device of claim 9, wherein the plurality of communication devices within the anchorless mobile backhaul communication system includes at least one of the 15 WCAN device, a network router, a network switch, a data center, a cloud data storage device, or a route locator (RLOC).

13. The WCAN device of claim 9 further comprising:
a base station, a distributed base station, an Evolved Node B (eNodeB), a Home Evolved Node B (Home eNodeB), or a 5G Evolved Node B (gNodeB), and wherein the wireless communication device includes a User Equipment (UE).

14. A method for execution by a wireless communication access node (WCAN) device, the method comprising:
communicating with a wireless communication device using radio frequency (RF) interface circuitry of the WCAN device;
communicating with an anchorless mobile backhaul communication system operating under a locator/identifier separation protocol (LISP) by using network communication circuitry of the WCAN device;
retrieving a policy profile record associated with the wireless communication device from a distributed cloud database that is distributedly implemented within the anchorless mobile backhaul communication system, wherein the distributed cloud database stores a plurality of policy profile records for a plurality of wireless communication devices including the policy profile record associated with the wireless communication device and a plurality of communications statistics records for the plurality of wireless communication devices including a communications statistics record associated with the wireless communication device;
facilitating communications of the wireless communication device in accordance with the policy profile record associated with the wireless communication device;
collecting communications statistics based on the communications of the wireless communication device; and
updating the communications statistics record associated with the wireless communication device within the distributed cloud database to include the communications statistics that are collected based on the communications of the wireless communication device.

15. The method of claim 14, wherein the distributed cloud database is implemented based on a Distributed Hash Table (DHT) that is distributedly implemented across a plurality of communication devices within the anchorless mobile backhaul communication system, and further comprising:
processing an identifier associated with the wireless communication device based on a hash function associated with the DHT to generate a key associated with the wireless communication device;
identifying a communication device of the plurality of communication devices within the anchorless mobile backhaul communication system that stores the key associated with the wireless communication device; and
retrieving at least one of the policy profile record associated with the wireless communication device or the communications statistics record associated with the wireless communication device from the communication device of the plurality of communication devices within the anchorless mobile backhaul communication system that is identified.

16. The method of claim 14 further comprising:
facilitating packet data network (PDN) communications between the wireless communication device and a PDN via the anchorless mobile backhaul communication system;
collecting PDN communications statistics based on the PDN communications between the wireless communication device and the PDN; and
updating the communications statistics record associated with the wireless communication device within the distributed cloud database to include the PDN communications statistics.

17. The method of claim 14 further comprising:
facilitating other communications between the wireless communication device and another wireless communication device via the anchorless mobile backhaul communication system in accordance with the policy profile record associated with the wireless communication device, wherein the another wireless communication device is configured to communicate with the anchorless mobile backhaul communication system via another WCAN device;
collecting other communications statistics based on the other communications between the wireless communication device and the another wireless communication device; and
updating the communications statistics record associated with the wireless communication device within the distributed cloud database to include the other communications statistics.

18. The method of claim 14 further comprising:
facilitating first communications between the wireless communication device and another wireless communication device via the anchorless mobile backhaul communication system in accordance with the policy profile record associated with the wireless communication device, wherein the another wireless communication device is configured to communicate with the mobile backhaul communication system via another WCAN device;
collecting first communications statistics based on the first communications between the wireless communication device and the another wireless communication device;
updating the communications statistics record associated with the wireless communication device within the distributed cloud database to include the first communications statistics;
performing a handover procedure of the another wireless communication device from the another WCAN device within the anchorless mobile backhaul communication system to the WCAN device;
retrieving another policy profile record associated with the another wireless communication device from the distributed cloud database that is distributedly implemented within the anchorless mobile backhaul communication system;
facilitating second communications between the wireless communication device and the another wireless communication device via only the WCAN device within the anchorless mobile backhaul communication system in accordance with the policy profile record associated with the wireless communication device and the another policy profile record associated with the another wireless communication device;
collecting second communications statistics based on the second communications between the wireless communication device and the another wireless communication device;
updating the communications statistics record associated with the wireless communication device within the distributed cloud database to include the second communications statistics; and
updating another communications statistics record associated with the another wireless communication device within the distributed cloud database to include the second communications statistics.

19. The method of claim 14, wherein:
the anchorless mobile backhaul communication system operating under the LISP protocol specifies a dynamic mapping between a first name space corresponding to the plurality of wireless communication devices and a second name space corresponding to locations of the plurality of wireless communication devices based on a plurality of route locators (RLOCs) of the mobile backhaul communication system;
the distributed cloud database is distributedly implemented across a plurality of communication devices within the anchorless mobile backhaul communication system; and
the plurality of communication devices includes at least one of the WCAN device, a network router, a network switch, a data center, a cloud data storage device, or a route locator (RLOC).

20. The method of claim 14, wherein the WCAN device includes a base station, a distributed base station, an Evolved Node B (eNodeB), a Home Evolved Node B (Home eNodeB), or a 5G Evolved Node B (gNodeB), and wherein the wireless communication device includes a User Equipment (UE).

* * * * *